United States Patent [19]

Zoerner et al.

[11] Patent Number: 5,397,948
[45] Date of Patent: Mar. 14, 1995

[54] MAGNETIC MOTOR WITH TEMPERATURE RELATED ACTIVATION

[75] Inventors: Marty M. Zoerner, Reed City; Stephen R. W. Cooper, Tustin, both of Mich.

[73] Assignee: Nartron Corporation, Reed City, Mich.

[21] Appl. No.: 30,817

[22] Filed: Mar. 12, 1993

[51] Int. Cl.⁶ .................... H05B 1/02; H01H 9/00
[52] U.S. Cl. .................... 310/46; 310/68 C; 335/208; 219/413
[58] Field of Search .................... 310/46, 273, 68 C; 335/208, 298, 6; 219/413

[56] References Cited

U.S. PATENT DOCUMENTS

| | | | |
|---|---|---|---|
| 3,538,467 | 11/1970 | Middendorf | 335/146 |
| 3,815,942 | 6/1974 | White | 292/113 |
| 4,088,354 | 5/1978 | Kolendowicz | 292/201 |
| 4,104,507 | 8/1978 | Tisone et al. | 219/513 |
| 4,266,211 | 5/1981 | Ulanet | 335/208 |
| 4,345,144 | 8/1982 | Bergquist | 219/413 |
| 4,374,320 | 2/1983 | Barnett | 219/413 |
| 4,862,870 | 9/1989 | Fox | 126/197 |
| 5,004,276 | 4/1991 | Hanley | 292/126 |

Primary Examiner—Steven L. Stephan
Assistant Examiner—D. R. Haszko
Attorney, Agent, or Firm—Lon H. Romanski

[57] ABSTRACT

A magnetic motor is shown having magnetic members situated in relatively close proximity to each other; relative movement between the magnetic members is brought about by bringing the temperature of at least one of the magnetic members to the curie temperature thereof, and subsequent relative movement between the magnetic members is brought about by having the temperatures of all of the magnet members less than the curie temperatures thereof.

68 Claims, 10 Drawing Sheets

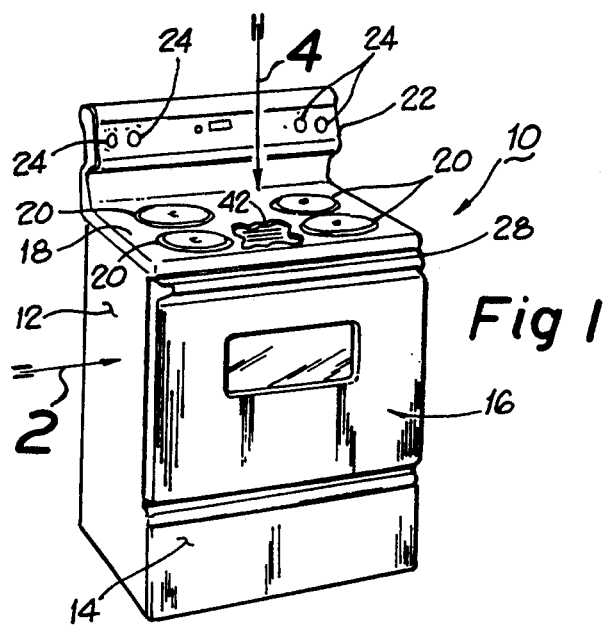

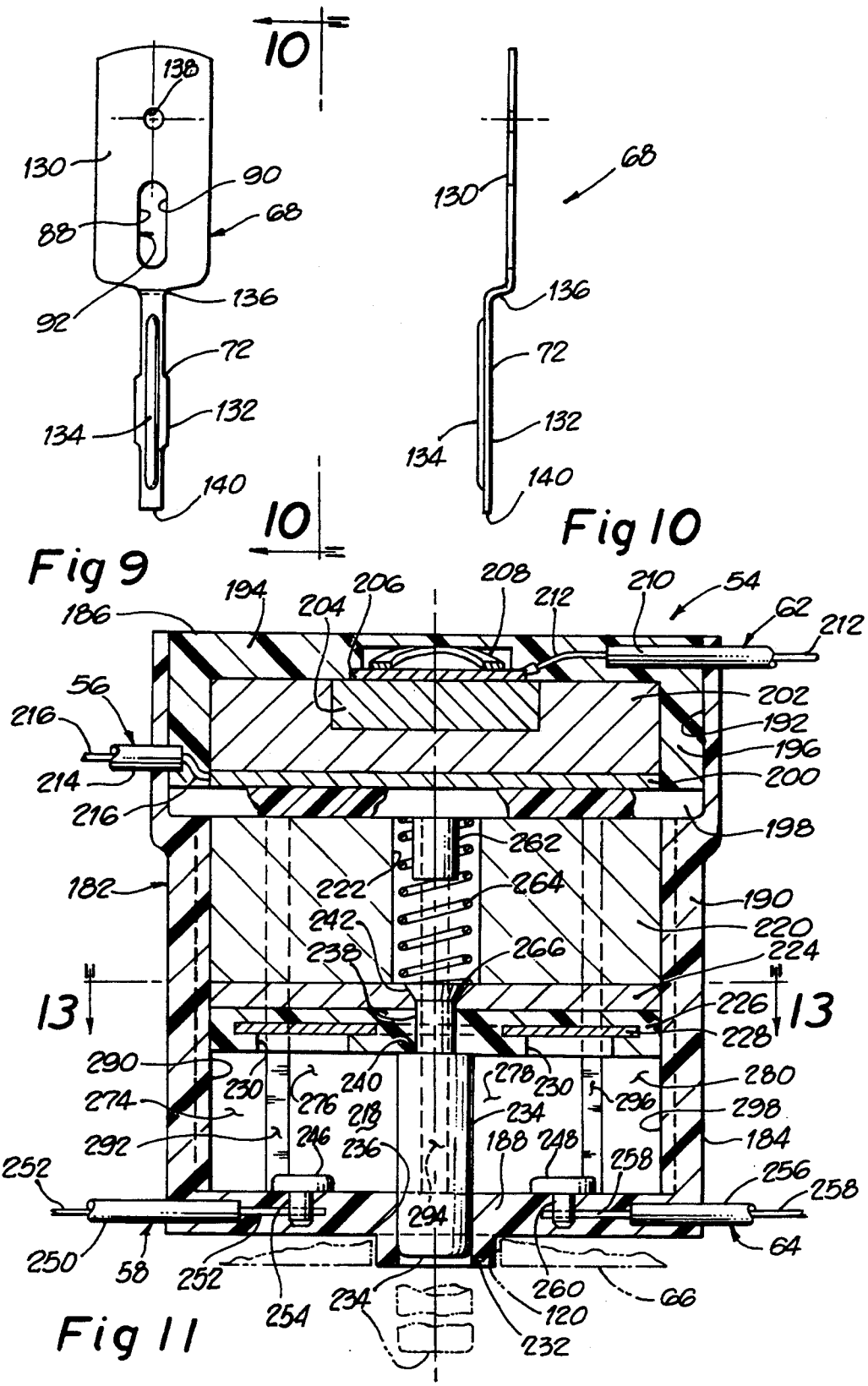

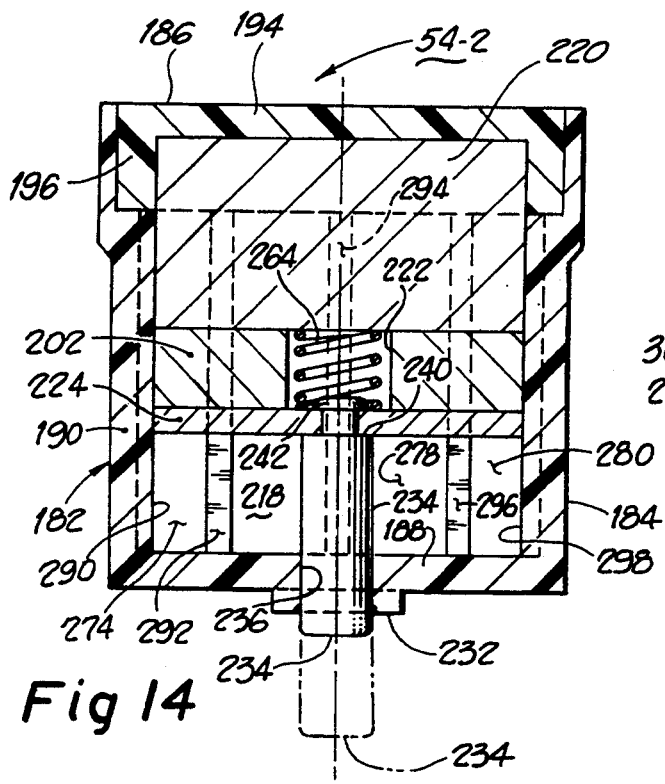
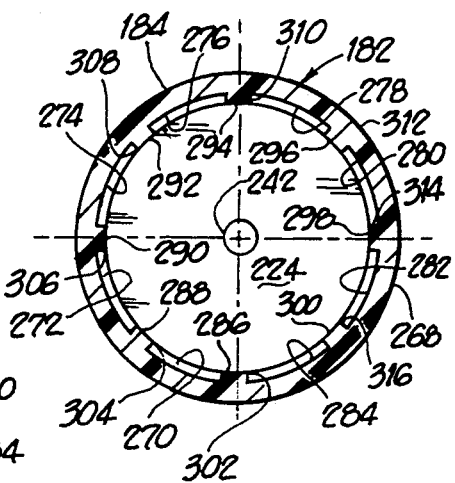
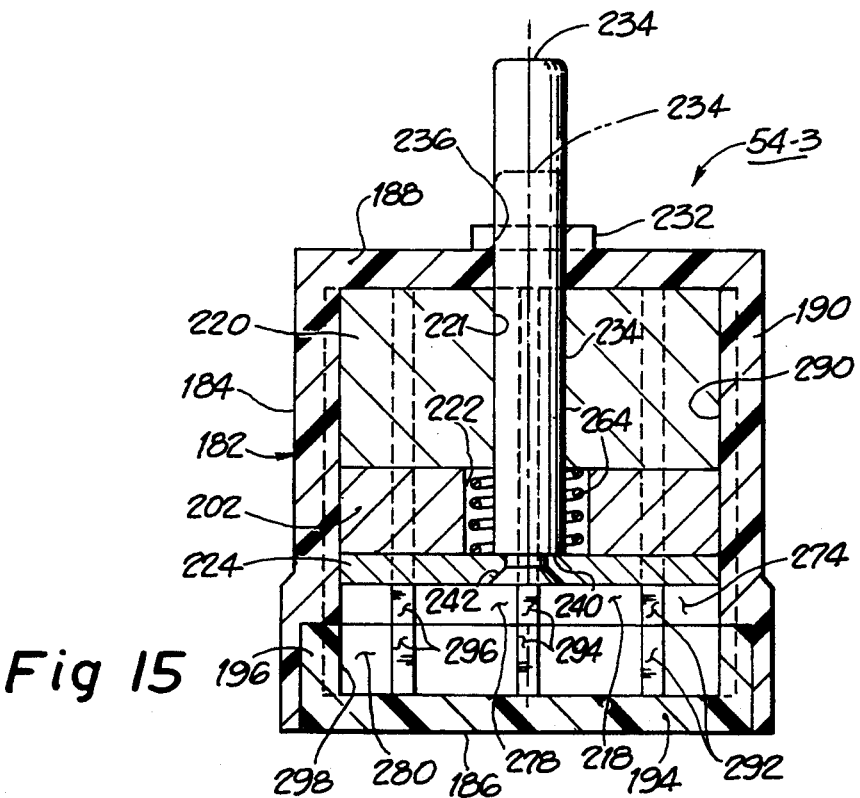

MAGNETIC MOTOR WITH TEMPERATURE RELATED ACTIVATION

FIELD OF THE INVENTION

This invention relates generally to a magnetized member or members and more particularly to such magnetized member or members which, upon being heated to a selected temperature or temperatures, become effective to produce a motion which, in turn, may be employed to control and/or actuate related or associated elements, structures, switches and the like.

BACKGROUND OF THE INVENTION

At least one of the preferred embodiments of the invention is disclosed as performing the function of preventing open access to a heated chamber wherein access to such heated chamber is to be denied until the temperature of the chamber has become reduced to a preselected temperature.

In the prior art where a chamber or other device is heated, it is often necessary to provide a lockout mechanism that will prevent access when the temperature of said chamber or other device is considered excessive in having a person become exposed to such temperature.

For example, many ovens intended for home cooking are equipped with a "cleaning cycle" mode of operation. When in such mode, the oven temperature is caused to be elevated to magnitudes at which grease or other carbon based deposits can readily ignite. Opening such an oven at the elevated cleaning temperatures could result in a sudden burst of flame from out of the oven with the attendant possibility of personal injury.

Similarly, other structural environments such as, for example, test chambers, fluid valves or other mechanisms may be of the type wherein they may be safely operated at or below a given or selected temperature, but not above such temperature. In other devices and/or apparatus the converse may be true; i.e., the devices and/or apparatuses can be operated above a certain temperature but not below. In situations such as these it is extremely desirable to have a lockout means that brings about latching or unlatching when the temperature at issue either goes above or below a desired control temperature. Further, it is desirable to have "fail safe" operation where the latching or unlatching action takes place without the need for external power.

A common solution to the foregoing by the prior art is to employ a bimetal leaf or bimetal coil responsive to a monitored temperature. In the prior art, the bimetal leaf or coil will bend or unbend as the monitored temperature is varied and such bending or unbending can be employed to, in turn, engage or disengage, for example, a latch or make, or break, a related electrical circuit.

In the prior art, bimetal disks are also used to provide a snap action when a particular transition temperature is passed. Among the difficulties experienced by the prior art, unit to unit (as in production quantities) variation in their operation results in the further need for calibration or significantly close and costly manufacturing dimensional tolerances. Further, experience has shown that in such prior art devices, the operating forces developed thereby are often of a low magnitude, even boardering on becoming an insufficient magnitude.

The invention as herein disclosed is primarily directed to the solution of the aforestated prior art problems as well as to other related and attendant problems.

SUMMARY OF THE INVENTION

According to one aspect of the invention, a fixed magnetic member operatively acts upon a pin, against the force of gravity, and wherein said magnetic member ceases to operatively act upon said pin when said magnetic member is heated to its demagnetization temperature.

In another aspect of the invention, a fixed magnetic member operatively acts upon a pin which is influenced by both gravity and resilient means serving to urge the pin in a direction away from said magnetic member, and wherein said gravity and resilient means cause the pin to undergo motion upon said magnetic member being heated to its demagnetization temperature.

Other general and specific objects, aspects and advantages of the invention will become apparent when reference is made to the following detailed description considered in conjunction with the following drawings.

BRIEF DESCRIPTION OF THE DRAWINGS

In the drawings wherein for purposes of clarity certain elements and/or details may be omitted from one or more views:

FIG. 1 illustrates in perspective a stove assembly, including an oven, as may be intended for home use;

FIG. 2 is a view of an enlarged fragmentary portion of the oven door, of the stove of FIG. 1, taken generally in the direction of arrow 2 and with the oven door being moved to a partially opened position;

FIG. 3 is a view of a relatively enlarged fragmentary portion of the oven door shown in FIG. 2, taken generally on the plane of line 3—3 and looking in the direction of the arrows;

FIG. 4 is an enlarged view of apparatus employing teachings of the invention with such view being obtained by, in the drawing of FIG. 1, cutting or breaking away the top cover member of the stove and then looking at the apparatus generally under such top cover in the direction of arrow 4;

FIG. 9 is a view of an other of the elements shown in FIG. 4;

FIG. 10 is a view taken generally on the plane of line 10—10 of FIG. 9 and looking in the direction of the arrows;

FIG. 11 is an enlarged axial cross-sectional view of one of the sub-assemblies of FIG. 4, employing teachings of the invention, taken generally on the plane of line 11—11 of FIG. 4 and looking in the direction of the arrows;

FIG. 13 is a cross-sectional view, of comparatively reduced scale, taken generally on the plane of line 13—13 of FIG. 11 and looking in the direction of the arrows;

FIG. 14 is an axial cross-sectional view of another assembly employing teachings of the invention;

FIG. 15 is an axial cross-sectional view of still another assembly employing teachings of the invention;

DETAILED DESCRIPTION OF THE PREFERRED EMBODIMENTS

Figure 5:
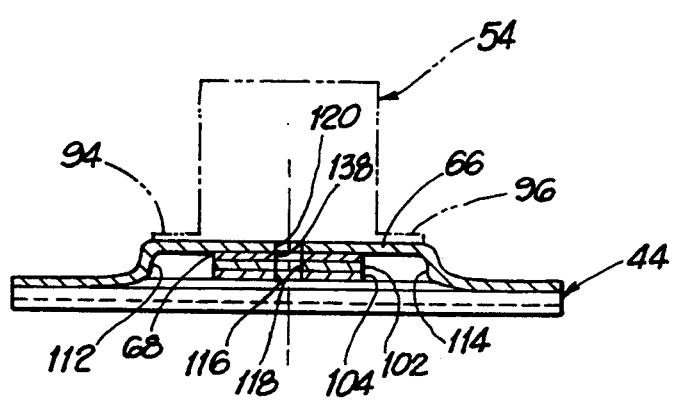
FIG. 5 is a cross-sectional view of the apparatus of FIG. 4 as well as FIG. 6, taken generally on the plane of line 5—5 of either FIGS. 4 or 6 with one of the subassemblies being shown in phantom line.

Referring now in greater detail to the drawings, a cooking stove assembly 10 is shown in FIG. 1 as comprising outer housing panels 12 and 14 (others not being seen in Fig. 1), a door 16 openable to gain access to the oven and broiling chamber, an upper or top cover panel 18, a plurality of heating elements or burners 20—20 and an operator's control panel 22 carrying an array of controls, some of which are depicted at 24—24.

FIG. 2 illustrates in somewhat relatively enlarged scale a fragmentary portion of stove door 16 partly opened as to have the inner surface 26 thereof swung away from the oven chamber within the stove assembly 10. The door 16 may be provided with a generally laterally extending handle 28 by which an operator may pivotally rotate or swing the door 16 toward and away from a closed position.

As shown in both FIGS. 2 and 3, with FIG. 3 illustrating a relatively enlarged fragmentary portion of the door 16, an arm-like latching member 30 is suitably secured, as by screws 32 and 34, to and against what may be considered the inner side of oven door 16. In the preferred form, the latching member 30 comprises a laterally extending plate-like portion 36 with a generally medially located integrally formed arm portion 38 extending therefrom and normal thereto. The free end of arm portion 38 has an integrally formed upstanding abutment-like latching portion 40. The screws 32 and 34 serve to secure the plate-like portion 36 against the door 16.

If the top or cover panel 18 of the stove 10 were to have a portion thereof broken away as at 42, what would be seen, when looking in the direction of arrow 4, is the mechanism depicted, in relatively enlarged scale, in FIG. 4 wherein the phantom lines identified by 42 serve to represent the broken away portion of the cover panel 18 while the phantom lines identified by 18 serve to represent a forward portion of the cover panel 18, as to the forward-most edge thereof, which would exist above and cover the various elements in FIG. 4 which are depicted as generally bounded by phantom line 42 and phantom lines 18.

The overall assembly depicted in FIG. 4 comprises a mounting base plate 44 which is fixedly secured to associated support structure of said stove as by screws or other suitable fastening means extending through the holes 46, 48, 50 and 52, of the mounting or support base plate, and operatively engaging said associated support structure situated generally under the base plate 44.

A magnetic motor assembly, employing teachings of the invention, is depicted at 54 and shown as comprising extending electrical conductor means 56, 58, 62 and 64.

As will become more apparent, the magnetic motor 54 is situated atop a raised bridge-like portion 66, formed out of the base plate 44, as to thereby also be situated at an elevation generally above a slide member 68 which is normally resiliently urged downwardly, as viewed in FIG. 4, by spring means 70 generally circumscribing a portion of such slide member 68 and axially contained and preloaded by an abutment portion 72 carried by the slide member 68 and a fixed abutment 74 formed from and upwardly of the base plate 44.

Below the slide member 68 are a pair of levers 76 and 78 which have their respective forward portions 80 and 82 at, effectively, the same elevation while their respective rearward portions (best seen in FIGS. 5, 6, 7 and 8) are at differing elevations.

Figure 6:
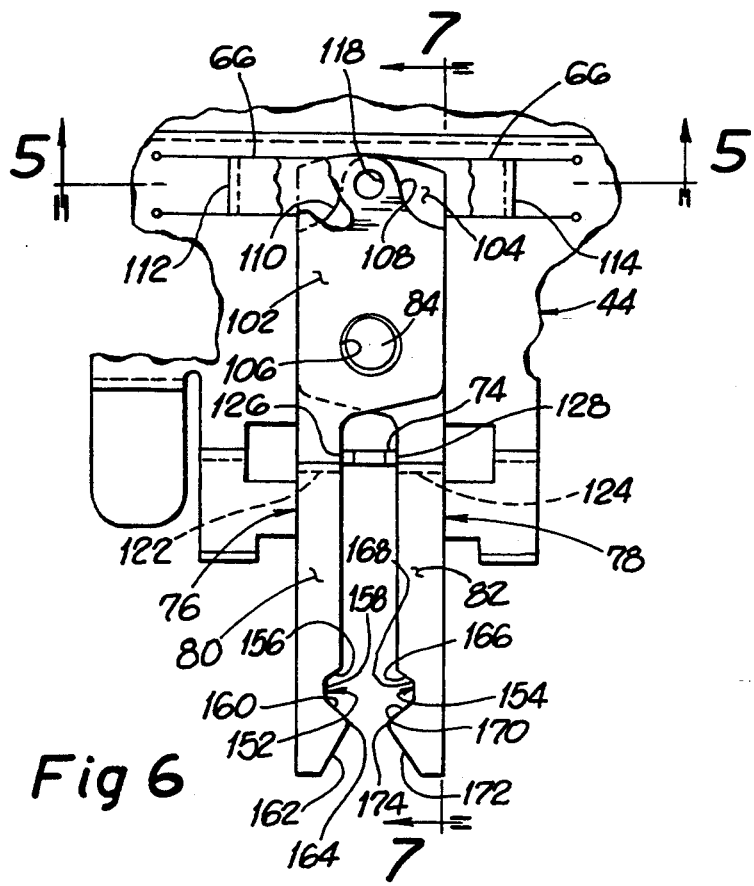
FIG. 6 is a view generally corresponding to that of FIG. 4 but showing only a fragmentary portion of the structure of FIG. 4 and, further, with certain of the elements shown in FIG. 4 being removed.
Figure 7:
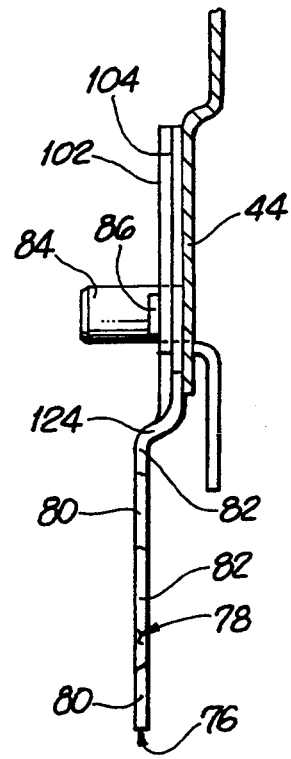
FIG. 7 is a view taken generally on the plane of line 7—7 of FIG. 6 and looking in the direction of the arrows.

Referring to all of FIGS. 4, 5, 6, 7, 9 and 10, a suitable guide and pivot post 84 is fixedly secured to the base plate or body 44 and extends upwardly therefrom as possibly best seen in FIG. 7.

In the preferred embodiment of the arrangement, post 84 is provided with a pair of oppositely situated formed flatted surfaces, one of which is shown at 86 of FIG. 7. The diametrical distance between such flatted surfaces is such as to closely receive thereagainst, in sliding relationship, the opposed sides 88 and 90 of the elongated slot 92 of slide member 68.

As shown in FIG. 4, and indicated in phantom line in FIG. 5, the magnetic motor assembly 54 is provided with tab-like or arm-like portions 94 and 96 which are provided as with holes, one of which is shown at 98, and screws passing through such holes, one of such screws being shown at 100, whereby the assembly 54 is rigidly secured to and atop of the bridge 66.

Levers 76 and 78 respectively have relatively wider body portions 102 and 104 each of which is provided with an aperture 106 closely receiving post or pivot means 84 for rotation thereabout. In the preferred arrangement, body 102 is formed with a generally cut-away portion, forming a curvilinear edge 108, while, similarly, body 104 is formed with a generally cut-away portion forming a curvilinear edge 110. Such cut-away provide clearance as to preclude any possibility of the bodies 102 and 104 striking the support or end portions 112 and 114 of bridge 66 when levers 76 and 78 rotate or pivot about post 84.

Figure 8:
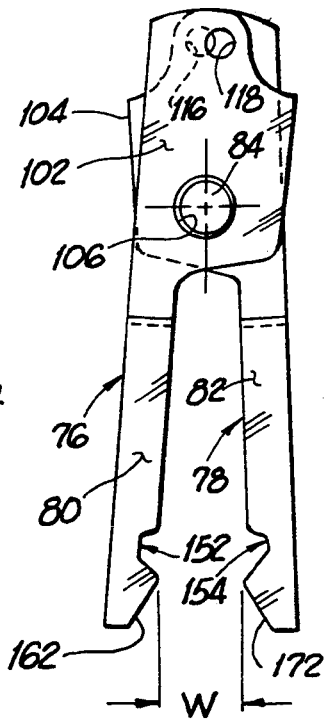
FIG. 8 is a view of two of the elements shown in FIG. 6 but with such elements being depicted in operating positions different from that shown in FIG. 6.

As can be seen in any of FIGS. 5, 6, 7 and 8, body portion 102 of lever 76 is situated above body portion 104 of lever 78. Referring first to FIG. 8, body portion 102 has an aperture 118 formed therethrough and, similarly, body portion 104 has an aperture 116 formed therethrough. As depicted in FIG. 8, when levers 76 and 78 are rotated about post 84 in directions whereby lever arms 80 and 82 move away from each other, apertures or passages 116 and 118 are moved out of registry or alignment with each other. However, when levers 76 and 78 are brought to what may be considered a closed or "home" position, depicted for example in FIGS. 4, 5 and 6, apertures or passages 116 and 118 come into alignment with each other and into alignment with an aperture or passage 120 formed through bridge 66 (FIG. 5).

Even though body 102 is situated above body 104, lever arms 80 and 82 are effectively at the same elevation (FIG. 7) by respective bend portions 122 and 124. In the preferred arrangement, the closed or home positions of levers 76 and 78 are determined by respective abutment or stop surfaces 126 and 128, carried as by member 74 (FIG. 6), against which the lever arms 80 and 82 abut.

Referring again to FIGS. 4, 9 and 10, the slide member 68 is illustrated as comprising a relatively wide body 130, through which the slot 92 is formed, and an integrally formed probe-like or finger-like portion 132 which may have a longitudinally extending rib-like portion 134 formed therein for enhancing the strength of finger portion 132. In the preferred arrangement, the finger or extension 132, integrally joined to body 130 as at 136, is at an elevation higher than that of body 130. Body 130 of slide member 68 is also provided with an aperture or passage 138 formed therethrough.

Referring to FIGS. 4 and 5, it can be seen that the body 130 of slide member 68 is situated atop body 102 of lever means 76 as to extend under the bridge 66 and as to receive the post 84 in slot 92. When slide member 132 is in its outwardly resiliently extended or "home" position, as depicted in FIG. 4, the end of slot 92 is in abutting engagement with post 84, aperture 138 is displaced from aperture or passage 120 (as well as passages 116 and 118 in alignment therewith) and end 140 of extension 132 is at its maximum outward or extended location. As will become apparent, with the other elements in FIG. 4 maintaining their respective depicted positions, when end 140 of extension 132 is engaged and the entire slide member 68 is moved rearwardly (upwardly as viewed in FIG. 4) to its maximum position there, aperture or passage 138, of slide member 68, becomes aligned with apertures 120, 116 and 118 (also see FIG. 5) forming a continuous passage means.

A coiled torsion spring 142 is carried by post or pivot pin 84 as to be situated generally slightly above slide member 68 and as to have diverging arms 144 and 146 with downwardly extending arm portions 148 and 150 which respectively continuously engage the generally outer edges of lever means 76 and 78 as to thereby resiliently urge the lever means 76 and 78 to their home positions, i.e., abutting against stop surfaces 126 and 128 (FIGS. 4 and 6).

When such apertures or passages 138, 120, 116 and 118 are thusly brought into alignment, the continuous passage formed thereby is capable of receiving a locking member therein, such as a cylindrical pin which would then preclude slide 68 moving forwardly (downwardly as viewed in FIG. 4) and lever arms 80 and 82 from pivotally moving away from each other.

When slide member 68 is in the position depicted in FIG. 4, the passage 138 formed therethrough is laterally spaced from the other aligned apertures or passages 120, 116 and 118 thereby precluding the insertion of any locking member into such passages 120, 116 and 118.

Without, for the time being, being concerned about how a locking pin or other locking member may be inserted into the described aligned apertures 138, 120, 118 and 116, first the operation of the other mechanical structure disclosed in FIGS. 1, 2, 3, 4, 5, 6, 7, 8, 9 and 10 will be considered with, of course, any locking pin or other locking member being absent from the consideration.

As can be best seen in FIGS. 4, 6 and 8, lever arms 80 and 82 are provided as with mirror image recesses 152 and 154. Recess 152 is shown as comprising an inwardly directed surface 156, a generally longitudinally extending surface 158 and an inclined ramp-like surface 160. Further, surface or edge 160 meets a second inclined or ramp-like edge or surface 162 as at an apex 164.

Similarly, recess 154 is shown as comprising an inwardly directed surface 166, a generally longitudinally extending surface 168 and an inclined ramp-like surface 170. Further, surface or edge 170 meets a second inclined or ramp-like edge or surface 172 as at an apex 174.

Let it now be assumed that the structure as shown in FIG. 4 has its elements in the positions depicted (with all of such being mounted onto the supporting structure of the stove 10) and that a partially or fully opened oven door 16 is sought to be closed thereby closing the oven chamber from ambient.

As the top of the oven door 16 is swung toward the remainder of the stove 10, the latch or catch member 30 carried by the door 16 approaches both the ramp edges or surfaces 162 and 172 of lever means 76 and 78 and also approaches the end 140 of slide extension 132.

The width, W, of latch or catch portion 40 of member 30 is preferably of a dimension slightly less than the distance across the widest part of ramp surfaces 162 and 172. Therefore, when oven door 16 is moved sufficiently toward the lever arms 80 and 82 the upstanding bracket-like wall 40 engages both ramp surfaces 162 and 172 with further movement of the door 16, in the same direction, causing both lever arms 80 and 82 to pivotally move away from each other. Prior to latch bracket wall 40 passing between the apexes 164, 174, wall 40 engages end 140 of slide member extension 132 causing such to be moved inwardly (upwardly as viewed in FIG. 4). Such inward movement, against the resilience of spring 70, of extension 132 and slide member 68 continues until the latch wall 40 passes between the apexes 164 and 174 and continues until contained within recesses 152 and 154 at which time the longitudinal edge or surface 158 of lever arm 80 becomes engaged with side or edge 176 of latch wall 40 and longitudinal edge 168 of lever arm 82 becomes engaged with side or edge 178 of latch wall 40. The torsion spring 142 keeps the lever arms 80 and 82 operatively lockingly engaged with latch wall 40 thereby holding the oven door 16 closed. When the oven door has attained such closed condition, the latch wall 40 would have also moved the extension 132 and slide body 68 sufficiently as to place aperture 138 in alignment with the other aligned apertures or passages 120, 116 and 118.

Accordingly, it should now be apparent that when the oven door 16 is made closed, the passage comprised of aligned apertures 138, 120, 116 and 118 is in condition for the reception of a locking member or pin as to thereby prevent lever arms 80 and 82 from being moved away from each other and thereby preventing the opening of the oven door which has its latch wall 40 contained against movement by the recesses 152 and 154 of lever arms 80 and 82.

In the condition now being considered, no such locking member or pin is received in aligned apertures 138, 120, 116 and 118. Therefore, all that needs to be done to again open the oven door 16 is to pull on the door handle 28 which causes bracket wall 40 to ride against ramp surfaces 160 and 170 of lever arms 80 and 82 causing such arms to progressively move, against the resilience of spring 142, away from each other to positions generally depicted in FIG. 8. After bracket wall 40 passes between the apexes 164 and 174 it, generally, slides along ramp surfaces or edges 162 and 172 thereby permitting the lever arms 80 and 82 to return to their FIG. 4 depicted home positions. Further, as the oven door 16 is thusly opened, the opening movement of bracket wall 40 permits the slide member 68 and extension 132 to also move to its depicted home position thereby placing aperture 138 out of alignment with the other apertures 120, 116 and 118. By so doing, even if somehow a locking member or pin were to be received by aperture 120 of bridge 66 such locking member could not be received by aligned apertures 118 and 116 because the body 130 of slide 68 would be blocking any movement through aperture 120 and into aperture 118. This, in effect, provides a safety factor whereby a locking member or pin can not prohibit the rotational movement of lever means 76 and 78 during a condition wherein the oven door 16 is partially or fully opened. The only opportunity for a locking member to prevent rotation of lever means 76 and 78 exists when the oven door 16 is closed, as already described, and other operating parameters are initiated or are present.

Referring now in greater detail to FIGS. 11 and 13, the magnetic motor assembly 54 is illustrated as comprising a housing 182 comprised as of a lower (as shown in FIG. 11) cup-like housing portion or section 184 and an upper housing portion or section 186 which may also be of a cup-like configuration. Housing sections 184 and 186 are each comprised of dielectric material.

As generally depicted housing section 184 comprises a lower end wall 188 integrally formed with an upwardly extending generally cylindrical side wall 190 in which, at its upper end, a counterbore 192 is formed. Housing section 186 comprises an end wall 194 integrally formed with a depending generally cylindrical side wall 196 received within counterbore 192.

A disk-like member 198, of dielectric material, is situated within counterbore 192, as against an annular shoulder thereof, and the upper housing section 194 is shown having its wall 196 in abutting engagement with insulator 198.

Situated generally within upper housing section 194 are a disk-like electrical conductor 200 and a disk-like electrically conductive ferrite 202. An electrically conductive positive temperature coefficient (PTC) resistance heater means 204 is shown in contact with the ferrite 202 and in electrical circuit with an electrically conductive member or contact 206. Spring means, such as an annular wave type spring 208, may be employed to continually urge and keep contact 206, PTC 204 and ferrite 202 operatively engaged. Conductor means 62, comprised as of dielectric outer material 210 and an internal conductor 212, has the electrical conductor 212 suitably electrically connected to contact means 206. Similarly, conductor means 56, comprised as of dielectric outer material 214 and an internal conductor 216, has the electrical conductor 216 suitably electrically connected to contact or conductor member 200.

A chamber 218, formed generally by housing section 184 side wall 190 and axially between insulator 198 and end wall 188, slidably receives an annular permanent magnet 220 which may be provided with a counterbore or passage 222. Axially adjacent to magnet 220 is a disk-like member 224 formed of magnetic (magnetizable) material and, operatively secured to disk-like member 224 is another disk-like member 226 formed of dielectric material and functioning as a carrier for a ring-like or annular electrical contact member 228. The carrier 226 is preferably provided with a ring-like or annular opening 230 generally below the annular contact member 228.

Preferably, the lower end wall 188 is formed with a cylindrical extension 232 the outer diameter of which is closely received as by aperture 120 (of bridge 66) which, of course would be somewhat enlarged from that as previously described with reference to FIG. 5. A passage 236 formed through wall 188 and extension 232 permits the slidable movement therein and therethrough of a cylindrical pin or output member 234 which is fixedly secured to the magnetic plate or member 224 and contact carrier 226. That is, output member 234 is provided with a necked-down portion 238, about which is an annular shoulder 240, and an integrally formed end 242 which is suitably formed against a counterbore or countersink portion of magnetic disk member 224 thereby holding the disk member 224 the contact carrier 226 and output member 234 in assembled relationship. Generally, when plate 224 and contact carrier 226 are caused to move downwardly (as viewed in FIG. 11) away from ferrite 202, the output member 234 is caused to extend some related distance beyond the housing means 182 as depicted in phantom line.

When disk plate 224 and contact carrier 226 are caused to move to their lower-most position in chamber 218, the ring-like or annular electrical contact 228 is brought into circuit completing engagement with fixed electrical contacts or terminals 248 and 246 which, as shown, may be carried by the lower end wall 188 as to be located generally diametrically opposite to each other with respect to the axis 294.

Conductor means 58, comprised of an outer dielectric material 250 and an inner electrical conductor 252, is shown having the conductor 252 in electrical connection with a base or stem portion 254 of contact 246. Similarly, conductor means 64, comprised of an outer dielectric material 256 and an inner electrical conductor 258, is shown having the conductor 258 in electrical connection with a base or stem portion 260 of contact 248.

In the preferred arrangement, the insulating disk-like member 198 is provided with a depending pilot portion 262 which serves as a pilot for one end of a coiled compression spring 264 the other end 266 of which is shown operatively engaging the disk-like member 224.

As shown in both FIGS. 11 and 13, in the preferred embodiment, the outer surface 268 of upstanding wall 184 of housing 182 is generally cylindrical while the inner surface thereof is alternately of smaller and larger internal diameters. More particularly, referring mainly to FIG. 13 a plurality of angularly spaced axially extending surfaces 270, 272, 274, 276, 278, 280, 282 and 284 are formed into the inner side of the upstanding wall 184 in a manner, preferably, having such surfaces as sectors of a cylindrical contour.

Intermediate such angularly spaced surfaces are a plurality of relatively angularly spaced narrow axially extending rib-like guide means or members 302, 304, 306, 308, 310, 312, 314 and 316 which are integrally formed with housing section 184. These rib-like guides extend generally radially inwardly and terminate in radially innermost surfaces 286, 288, 290, 292, 294, 296, 298 and 300 which are coincident with a cylindrical configuration of a dimension permitting the easy movement therealong of the permanent magnet 220, disk-like member 224 and contact carrier 226.

Without at this time considering the operation of the magnetic motor assembly 54 within the environment of FIGS. 1–10, the operation of assembly 54, itself can be described as follows.

As a reference or starting point, let it be assumed that the assembly 54 of FIG. 11 has all of its elements in positions depicted in FIG. 11 and that such assembly 54 is in an unactuated state.

When the ferrite 202 is at a temperture below its curie temperature, $T_c$, the permanent magnet 220 is attracted by and drawn toward the ferrite 202 thereby abutting against the dielectric member 198 as depicted in FIG. 11. Also, the disk-like member 224 being of magnetic material, as for example, iron or steel, and preferably in contact with permanent magnet 220, also is moved or held upwardly (as viewed in FIG. 11) by the attraction of the permanent magnet 220. Consequently, pin or actuating or output member 234, being secured to the disk-like member 224, is also in its upper-most position. In the preferred arrangement of magnetic motor 54, the coiled spring 264 becomes preloaded when the permanent magnet 220 and plate member 224 are in their positions depicted in FIG. 11.

Now, considering the activation of assembly 54, when sufficient voltage is applied to conductors 212 and 216 a large enough electrical current is caused to flow through the PTC member or heater 204 and through the ferrite 202 to rapidly (as in approximately one minute) heat the ferrite 202 to and beyond the curie temperature, $T_c$, of the ferrite 202. When the inherent limiting temperature, $T_p$, of the PTC heater 204 is approached the impedence of the PTC heater 204 dramatically increases and thereby reduces the current flow to a low enough level to prevent over heating of the PTC heater 204 and of the ferrite 202.

The ferrite 202 looses its magnetic properties when it is heated to or above its curie temperature, $T_c$. Such heating of the ferrite 202 can occur by the conduction of heat, to the ferrite 202, from the ambient environment and/or by application of a voltage to the terminal conductors 212 and 216 as already explained.

When the ferrite 202 thusly looses its magnetic properties there is no magnetic attraction between the ferrite 202 and the permanent magnet 220. The preload of the spring then causes the disk-like plate or member 224 to move in a downward direction (as viewed in FIG. 11) away from ferrite 202 and toward end wall 188. Plate 224 being magnetically coupled to the permanent magnet 220 causes permanent magnet 220 to move in unison with disk-like member 224.

As the permanent magnet 220 and disk-like member 224 thusly move toward end wall 188, the contact carrier 226, ring-like contact 228 and output member 234 also move downwardly (as viewed in FIG. 11) with such movement continuing until the ring-like contact 228 operatively engages electrical terminals 246 and 248 and thereby, acting as a switch, completing an electrical circuit as between contacts 246 and 248 as well as between electrical conductors 252 and 258 respectively electrically connected to contacts 246 and 248. Accordingly, as should now be apparent, at high temperature of ferrite 202, equal to or above its curie temperture, $T_c$, electrical continuity is established as between and through conductor 258, electrical contact 248, ring-like contact 228, contact 246 and conductor 252. Further, as such elements as herein described thusly move to their down-most (viewed in FIG. 11) positions, output member 234 is also extended through passage 236 to its most extended position as generally depicted in phantom line.

When the heating voltage previously applied to conductors 212 and 216 is removed and the ambient temperature decreases, the ferrite 202 will cool to a temperature below its curie temperature, $T_c$, thereby again regaining its magnetic properties. As a consequence, the permanent magnet 220, along with members 224, 226, 228 and 234, are drawn upwardly toward the ferrite 202. As this occurs, the circuit previously established by ring-like contact 228 and contacts 246 and 248 is again opened.

In view of the foregoing including the descriptions herein provided with regard to FIGS. 1–10, and now understanding the operation of the magnetic motor assembly 54 of FIG. 11, a further understanding of the operation of the structures of FIGS. 1, 2, 3, 4, 5, 6, 8, 9 and 10 can be obtained.

Referring to primarily FIGS. 2, 3, 4 and 8 if the oven door 16 is brought from an opened position and toward a closed position, the striker or latch portion 40 engages ramp surfaces 162 and 172 and with continued motion causes the levers 76 and 78 to move as to positions depicted in FIG. 8. At the same time such continued motion of latch portion 40 abuts end 140 of slide member 68 and, by the time latch portion 40 becomes contained between lever recesses 152 and 154, latch portion 40 will have moved slide member 68 to a position whereat aperture or passage 138 of slide member 68 becomes aligned with apertures or passages 120, 118 and 116 (FIG. 5).

At this time the output member or pin 234 of magnetic motor 54, although aligned with apertures or passages 138, 120, 116 and 118, is withdrawn in that pin 234 members 226 and 224 and permanent magnet 220 are held in their upper-most position by the magnetic attraction to ferrite 202.

If the stove operator does not want the oven to be "automatically" cleaned as by the production of very high temperatures within the oven (for example, 800°–900° F.), the closed oven door and all other related and described elements will simply remain in their described positions. If the stove operator should want to open the oven door 16, the door is in no way prevented from being opened; the only resistance to such opening of the oven door 16 would occur only from the torsion spring 142 resiliently resisting the required partial opening movements of levers 76 and 78.

However, if when the oven door 16 is closed, as previously described, and the operator desires to have the oven "automatically" cleaned, the operator actuates related electrical switch means which, in turn, as previously described with regard to FIG. 11, causes a voltage to be applied across conductors 212 and 216 (of conductor means 62 and 56, respectively) thereby heating the ferrite 202 to or above its curie temperature, $T_c$. As already explained, such ferrite temperature causes the ferrite to lose its magnetic properties resulting in (as hereinbefore described): (a) output member or pin 234 becoming fully extended and (b) ring-like contact 228 performing a switching function and completing an electrical circuit between contacts 246 and 248. As the pin 234 thusly becomes fully extended it passes into the passage defined by aligned apertures 120, 138, 116 and 118 and thereby serves to lock slide member 68, lever means 76 and lever means 78 in position thereby preventing the levers 76 and 78 to be swung to the positions depicted in FIG. 8 and, instead, assuring that such levers 76 and 78 maintain a locked position (as generally depicted in FIGS. 4 and 6) thereby preventing the withdrawal of latch portion 40 from out between lever recesses 152 and 154 and consequently holding the door 16 shut while the oven undergoes "automatic" cleaning.

Figure 12:
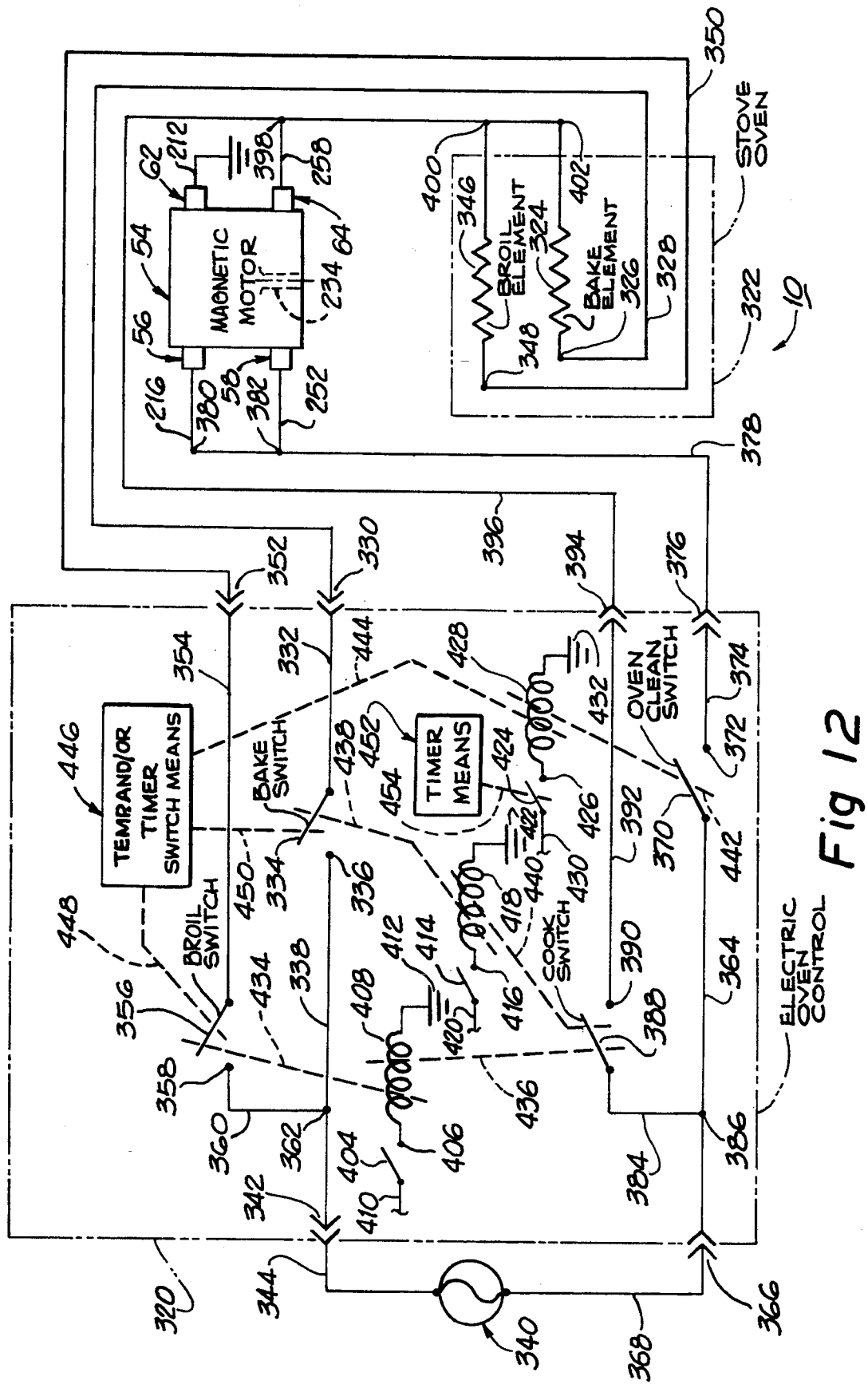
FIG. 12 is a partly schematic and partly diagrammatic electrical circuit depicting, among other things, the electrical control means of the stove of FIG. 1 and the assembly of FIG. 11.

FIG. 12 is both a schematic and diagrammatic wiring diagram illustrating the magnetic motor 54 within the electrical environment of the stove 10.

Referring in greater detail to FIG. 12, the overall electric oven control is defined generally by the phantom line 320 while the oven of the stove 10 is defined generally by the phantom line 322.

The electrical resistive element 324 for baking has one end 326 electrically connected to conductor means 328 which, as through connector means 330, is electrically connected to a conductor 332 which carries a switch member 334 effective to be at times closed as against a contact 336 carried by a conductor 338 leading to a source 340 of electrical potential as through connector means 342 and conductor 344.

The electrical resistive element 346 for broiling has one end 348 electrically connected to conductor means 350 which, as through connector means 352, is electrically connected to a conductor 354 which carries a switch member 356 effective to be at times closed as against a contact 358 carried by a conductor 360 which is connected as at 362 to conductor 338.

A conductor 364, connected to source 340 as via connector means 366 and conductor 368, carries a switch member 370 effective to be at times closed as against a contact 372 carried by a conductor 374. Connector means 376 serves to interconnect conductor 374 to a conductor 378 which is electrically connected to conductors 216 and 252 as at 380 and 382.

A branch-like conductor 384, connected as at 386 to conductor 364, carries a switch member 388 effective to be at times closed against a contact 390 carried by a conductor 392 which, through connector means 394, is electrically connected to a conductor 396. Conductor 396 is shown being electrically connected: (a) to conductor 258 as at 398; (b) to the opposite end of broil element 346 as at 400 and (c) to the opposite end of the bake element 324 as at 402.

A first manually operable switch 404 and contact 406, along with a relay coil 408, is shown having its conductor 410 leading to any suitable source of electrical potential and the other end of the relay coil 408 being grounded as at 412.

A second manually operable switch 414 and contact 416, along with a relay coil 418, is shown having its conductor 420 leading to any suitable source of electrical potential and the other end of relay coil 418 being grounded as at 422.

A third manually operable switch 424 and contact 426, along with a relay coil 428, is shown having its conductor 430 leading to any suitable source of electrical potential and the other end of relay coil 428 being grounded as at 432.

Still referring to FIG. 12, if an operator of the stove 10 wants to broil, the operator causes switch 404 to become closed thereby energizing relay coil 408 and the relay, via 434 and 436, causes the broil switch 356 to become closed and the cook switch 388 to become closed. With cook switch being closed a current path is provided through point 386, conductor 384, switch and contact 388, 390, conductor 392, conductor 396 to both points 400 and 402. The current path further comprises the resistive broil element 346, point 348 and conductor 350 to conductor 354, closed broil switch 356 to conductor 344 via conductor 360 and point 362. At this time, no current can flow through the electrically resistive bake element 324 because conductor 328 is electrically connected to conductor 332 but the circuit through conductor 332 is open because of bake switch 334 being open. When the desired degree of broiling is completed, switch 404 may be opened thereby causing the broil switch member 356 and the cook switch member 388 to open.

If an operator of the stove 10 wants to bake, the operator causes switch 414 to become closed thereby energizing relay coil 418 and the relay, via 438 and 440, causes the bake switch 334 and the cook switch 388 each to become closed. With cook switch 388 being closed, a current path is provided from source 340 via conductor 368 to point 386, conductor 384, switch and contact 388, 390, conductor 392, conductor 396 to where it is connected: (a) to conductor 258 as at point 398; to the other end of electrically resistive broil element 346 as at point 400; and (c) to the other end of electrically resistive bake element 324 as at point 402. Current will then flow in conductor 328, conductor 332, closed bake switch 334 and source 340 as via conductors 338 and 344. The current which was applied to the resistive broil element as at 400, by conductor 396 cannot result in any current flow in the electrically resistive broil element 346 because conductor 350 leads to conductor 354 which is in open circuit because of switch 356 being electrically open. When the desired degree of baking is completed, switch 414 may be opened thereby causing the bake switch member 334 and cook switch member 388 to each become open.

If an operator of the stove 10 wants to have the oven automatically cleaned, the operator closes switch 424 energizing the relay and the relay, in turn, via 442 causes the oven clean switch member 370 to become electrically closed and via 444 activates the temperature and/or timer and switch means 446 and through such, via 448, closes the broil switch member 356. Consequently, current path is provided from source 340, conductor 364, closed switch 370, conductor 378, conductors 216 and 212 (thereby heating the ferrite 202 as described with reference to FIG. 11), conductor 252, the made-closed circuit from contact 246 through ring contact 228 and contact 248 (as described with reference to FIG. 11), conductor 258 to point 400, resistive broil element 346, conductors 350, 354, closed broil switch 356 and conductors 360 and 344.

After the expiration of a preselected span of time and/or after the attainment of a preselected temperature in the stove oven 322, the temperature and/or timer switch means 446, via 450, closes bake switch 334 and opens broil switch 356. Consequently, the circuit through resistive broil element 346 becomes electrically open while, because now bake switch 334 and oven clean switch 370 are both closed, an electrical circuit is completed through resistive bake element 324. The current path of such circuit is defined by: source 340; conductors 368, 364, 374 and 378; conductors 216, 212 and 252, 258 of motor 54 (as previously described); point 402; resistive bake element 324; conductors 328, 332 (closed bake switch 334), 338, 334 and source 340.

After the stove oven 322 has been at the elevated cleaning temperature for a preselected span of time, timer means 452, via 454, opens switch 424 de-energizing relay coil 428. This, in turn, via 442, opens the closed oven clean switch 370 and via 444 de-activates the temperature and/or timer switch means 446 which, in turn, via 450 opens the closed bake switch 334. With broil switch 356 and cook switch 388 already having been opened, the resistive broil element 346 and bake element 324 become electrically isolated from the electric oven control 320 and de-energized. Also, because of such switches comprising oven control 320 being opened, the voltage previously applied to conductors 216 and 212 is terminated thereby allowing the ferrite 202 within assembly 54 to cool to below its curie temperature, $T_c$. This, in turn, restores the magnetic characteristics to ferrite 202 resulting in the output member 234 being withdrawn, as previously described, from the passage means comprised of apertures 116, 118 and 138 (FIG. 5). The oven door 16 can now be safely opened.

A ferrite, as is generally well known, is a ceramic magnet containing mainly iron oxides. The curie temperature, $T_c$, of a ferrite is that temperature at which the ferrite reversibly loses its magnetic characteristics. Generally, the curie temperature, $T_c$, of a ferrite, as well as of a permanent magnet, may be considered as an empirically obtained value. That is, the curie temperature will be determined by the materials employed in forming the ferrite as well as the processes used in conjunction therewith. Commercial suppliers of ferrite are able to design, and formulate, a ferrite or ferrites for a specific curie temperature or temperatures.

In one successful embodiment of the magnetic motor 54 of FIGS. 4 and 11, the ferrite 202 was obtained from Krystinel Corp. of 126 Pennsylvania Ave., Paterson, N.J. 07503 and had a Part No. RCT-6VTK-HQ/130 with such ferrite having a curie temperature of 130° C. Curie temperatures for permanent magnets 100° C. to 300° C. higher than those for ferrites are readily commercially available. In the disclosures herein made wherein both a ferrite and a permanent magnet are employed, the permanent magnet has a curie temperature higher than the cooperating ferrite curie temperature.

In one successful embodiment of the magnetic motor 54 of FIGS. 4 and 11, the PTC heater 204 was obtained from the Keystone Carbon Co. of St. Marys, Pa. 15857 with the type or part number being 5510-150-140-120-PTH having an operating voltage of 120v. and a no load resistance at 25° C. of 150 ohms.

In one successful embodiment of the magnetic motor 54 of FIGS. 4 and 11, housing sections 184 and 186, the dielectric insulator 198 and the contact carrier 226 were all comprised of "ULTEM". "Ultem" is a United States of America trademark, of General Electric Company, of Pittsfield, Mass., for a thermoplastic polyetherimide resin. Such resin may be obtained as from, for example, General Electric Company, Plastics Group, One Plastics Avenue, Pittsfield, Mass.

Further, in such successful embodiment of magnetic motor 54, the disk-like member 224 was comprised of "1008" to "1010" mild steel while output member 234 was comprised of "12L14" mild steel.

Various other sources are available for obtaining ferrites employable in practicing the invention. Among such sources is: Ceramic Magnetics of 16 Law Drive, Fairfield, N.J. 07004. Additionally, among sources for obtaining permanent magnets, which may have curie temperatures 100° C. to 300° C. higher than those of ferrites are: (a) Hitachi Magnetics Corp., in Edmore, Mich. 48829; and (b) TDK Corporation of America at 38701 Seven Mile Road, Suite 340, Livonia, Mich. 48152.

In the permanent magnet plus ferrite embodiments disclosed and discussed herein, the curie temperatures of the permanent magnets are considerably higher than the curie temperatures of the ferrites.

In the embodiments of FIGS. 14-21, except as may be noted to the contrary, those elements which are like or similar to those of FIG. 11 are identified with like reference numbers.

FIG. 14 illustrates what may be considered one of the simplest embodiments of the magnetic motor wherein a permanent magnet and a ferrite are employed.

Referring in greater detail to FIG. 14, when the temperature of the ferrite 202 is below the ferrite curie temperature, $T_c$, the ferrite 202 is attracted to and pulled against permanent magnet 220. When the temperature of the ferrite 202 is equal to or greater than the ferrite curie temperature, $T_c$, the ferrite 202 loses its magnetic properties and is effectively pushed away from the permanent magnet 220 by the preloaded spring 264. Depending on the masses employed and the relative spatial orientation of the magnetic motor 54-2, it would be possible to augment the force of spring 264 with the force of gravity and it would also be possible to eliminate spring 264 and merely employ the force of gravity to achieve separation of the ferrite 202, when it has lost its magnetic properties, from the permanent magnet 220.

As the ferrite 202 moves downwardly (as viewed in FIG. 14) a pin or output member 234 is pushed outwardly as through passage 236 to some position generally depicted at 234 in phantom line. Such actuating or output member 234, may, of course, serve to actuate any related or associated, control or device, or, as generally presented in FIGS. 1-11, either serve as a locking device or itself comprise a locking device.

When the temperature of the ferrite 202 is subsequently caused to become less than the curie temperature, $T_c$, thereof, the ferrite again regains its magnetic properties and is again attracted to the permanent magnet 220. As should now be apparent, by properly balancing the magnetic, spring and gravitational forces, the magnetic attraction between the ferrite 202 and the permanent magnet 220 will be sufficient to draw the ferrite 202 against the permanent magnet 220. Such movement of the ferrite 202 will pull plate 224 and pin or output member 234 generally toward permanent magnet 220 and, in so doing, cause the output member 234 to assume a new position less extending from housing 182. In actual practice, the output member 234 may provide a second function, to associated structure, when in such new, or drawn-in, position.

In the preferred embodiment of the magnetic motor 54-2 of FIG. 14, the movement of the ferrite 202 and actuator or output means 234 depends solely upon ambient heating and cooling of the ferrite 202 and whether such ambient heating raises the temperature of ferrite 202 to and above its curie temperature, $T_c$, and whether such ambient cooling reduces the temperature of the ferrite 202 to below its curie temperature, $T_c$. No direct external power, as such, is needed to bring about the curie temperature of ferrite 202.

In the embodiment of the magnetic motor 54-3 of Figure 15, when the temperature of the ferrite 202 is less than its curie temperature, $T_c$, the ferrite 202, along with disk member 224, is attracted and drawn to the permanent magnet 220. At this condition output or actuator means 234, slidably passing through a passage 221 in permanent magnet 220, is at its maximum extended position. When the temperature of the ferrite 202 is at or above its curie temperature, $T_c$, the ferrite loses its magnetic properties and is moved away from the permanent magnet 220 by the preloaded spring 264. Depending upon the spatial orientation or attitude of the embodiment of FIG. 15, the actuating force of spring 264 may be augmented or even replaced by gravitational force. As the ferrite 202 thusly moves away from permanent magnet 220, the pin or output member 234 is drawn inwardly into housing 182 (downwardly as viewed in FIG. 15) so that it assumes a position generally depicted in phantom line at 234. When the temperature of the ferrite 202 decreases to a value less than its curie temperature, $T_c$, the ferrite 202 regains its magnetic properties and, along with plate member 224, is attracted and drawn to the permanent magnet 220 assuming a position as generally depicted in FIG. 15.

Figure 16:
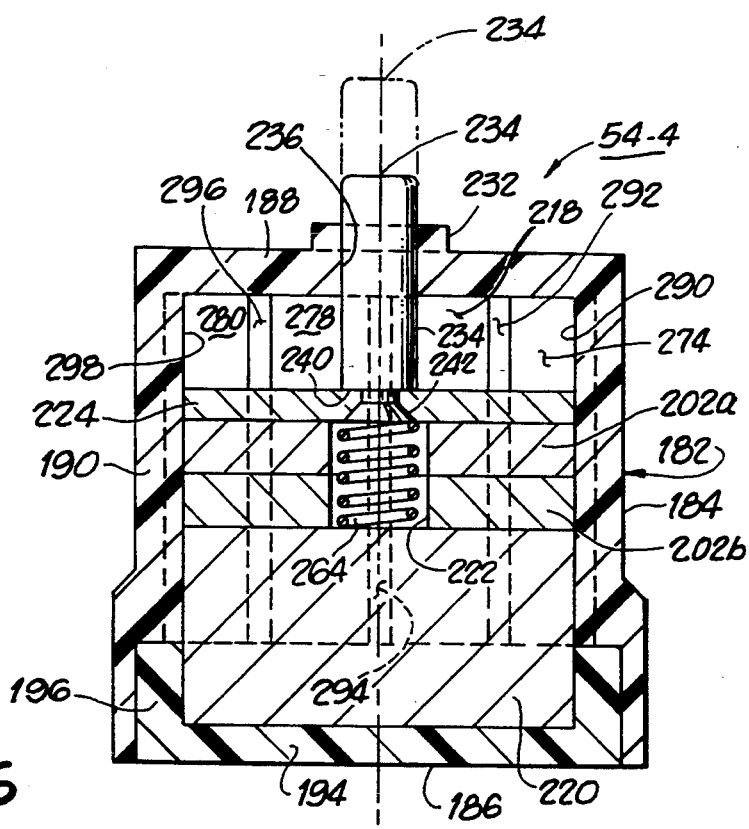
FIG. 16 is an axial cross-sectional view of yet another assembly employing teachings of the invention.

Referring in greater detail to the magnetic motor 54-4 of FIG. 16, a relatively low curie temperature, $T_{cl}$, ferrite 202b is situated generally between the permanent magnet 220 and a relatively high curie temperature, $T_{ch}$, ferrite 202a. As the temperatures of the ferrites 202b and 202a increase and attain a value equal to or above the low curie temperature, $T_{cl}$, the ferrite 202b loses its magnetic properties. However, the attraction between permanent magnet 220 and ferrite 202a remains and the force of such attraction is sufficient to overcome the preload of spring 264 and any gravitational force thereby enabling ferrite 202a to hold ferrite 202b effectively against permanent magnet 220.

When the temperature of the ferrites 202a and 202b is further increased to a value equal to or above the curie temperature, $T_{ch}$, the ferrite 202a loses its magnetic properties and the spring 264, through plate member 224, will move both ferrites 202a and 202b away from permanent magnet 220 causing the pin or output member 234 to be moved as to its maximum extended position generally depicted in phantom line at 234.

When, subsequently, the temperature of the ferrites 202a and 202b is reduced to a value less than the relatively high curie temperature, $T_{ch}$, but still equal to or greater than the relatively low curie temperature, ferrite 202a regains its magnetic properties (while ferrite 202b still does not). In this condition, since the ferrites 202a and 202b are in positions relatively remote from permanent magnet 220, the magnetic attraction provided by only ferrite 202a is insufficient to overcome the existing force of spring 264 and move itself and ferrite 202b back to the permanent magnet 220.

However, as the temperature of the ferrites 202a and 202b is further reduced to a value less than the relatively low curie temperature, $T_{cl}$, ferrite 202b regains its magnetic properties. The magnetic attraction provided by ferrite 202b added to the previously existing magnetic attraction provided by ferrite 202a results in a magnetic attractive force sufficient to move both ferrites 202a and 202b back toward permanent magnet 220 and, in so doing, cause the pin, actuating or output member 234 to be drawn inwardly of housing 182 (downwardly as viewed in FIG. 16).

Figure 17:
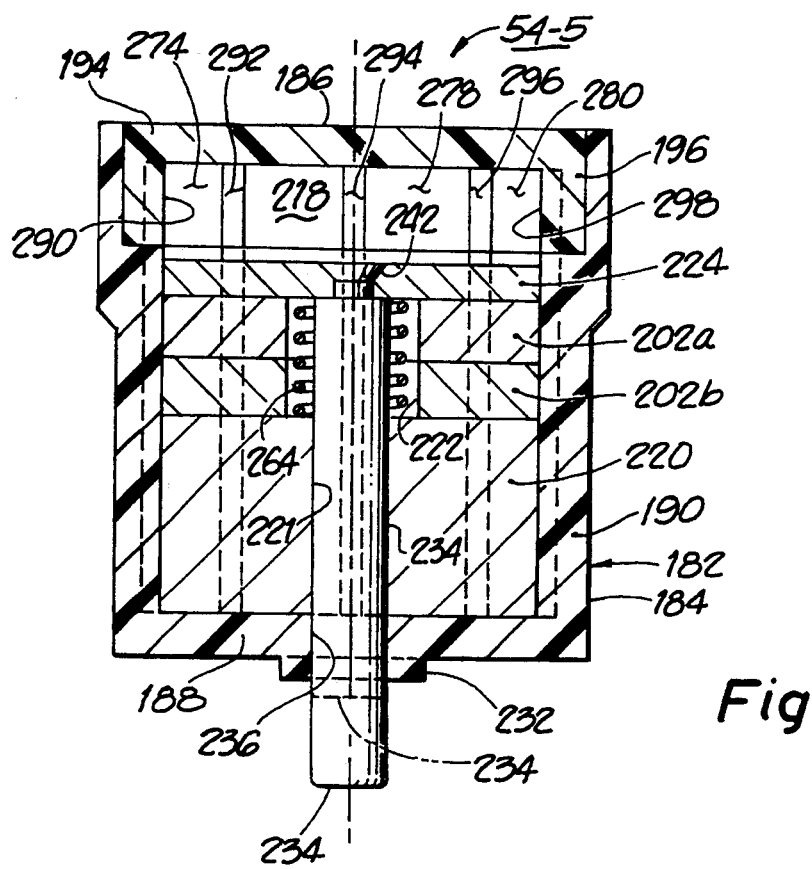
FIG. 17 is an axial cross-sectional view of a further assembly employing teachings of the invention.

Referring in greater detail to the embodiment of the magnetic motor 54-5 of FIG. 17, it can be seen that the relatively low curie temperature ferrite 202b is again between the permanent magnet 220 and the relatively high curie temperature 202a. The operation of the magnetic motor 54-5 is like that of the embodiment of FIG. 16 except that upon heating of the ferrites to a temperature equal to or above the relatively high curie temperature, $T_{ch}$, the pin or output member 234 is drawn inwardly of housing 182 (upwardly as viewed in FIG. 17) as to a position generally depicted in phantom line at 234. As in the embodiment of FIG. 16, ferrites 202a and 202b will not move or be drawn, back to the permanent magnet 220 until the temperatures of ferrites 202a and 202b is less than the relatively low curie temperature, $T_{cl}$, of ferrite 202b at which time the output or actuating member 234 will also be extended to its maximum position.

It should now be apparent that the embodiments of FIGS. 16 and 17 each provide a magnetic motor which exhibits a temperature hysteresis in its operation. The degree or extent of such temperature hysteresis may be selectively determined by the empirical selection of materials, the thickness thereof, as for example 198 of FIG. 11, along with appropriate relatively low and relatively high curie temperatures; i.e., $T_{cl}$ and $T_{ch}$.

Figure 18:
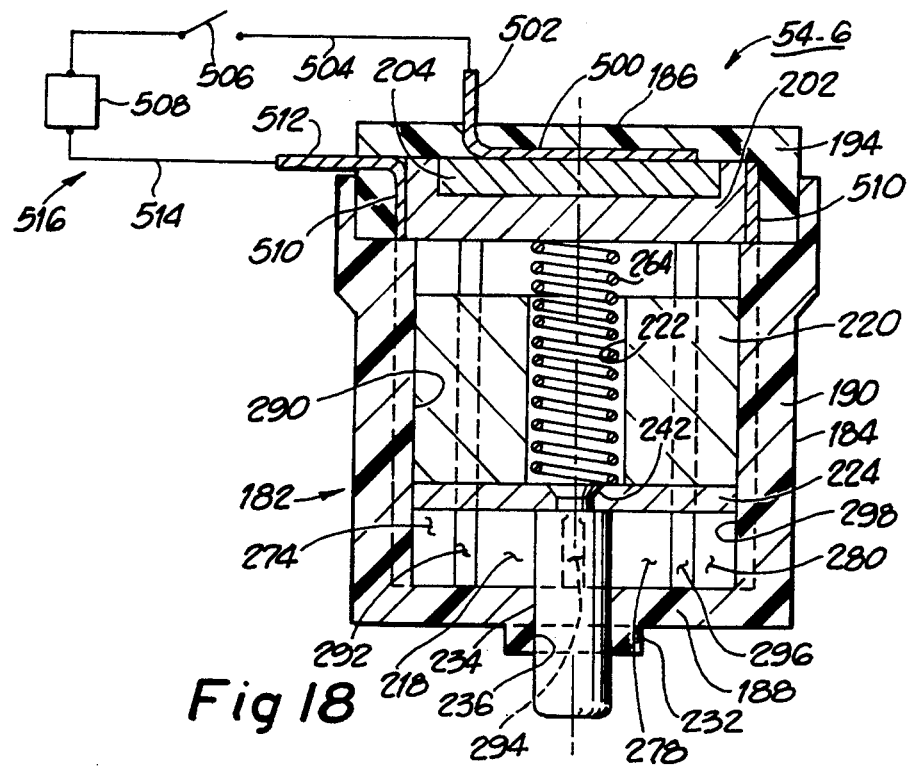
FIG. 18 is an axial cross-sectional view of another assembly employing teachings of the invention.
Figure 19:
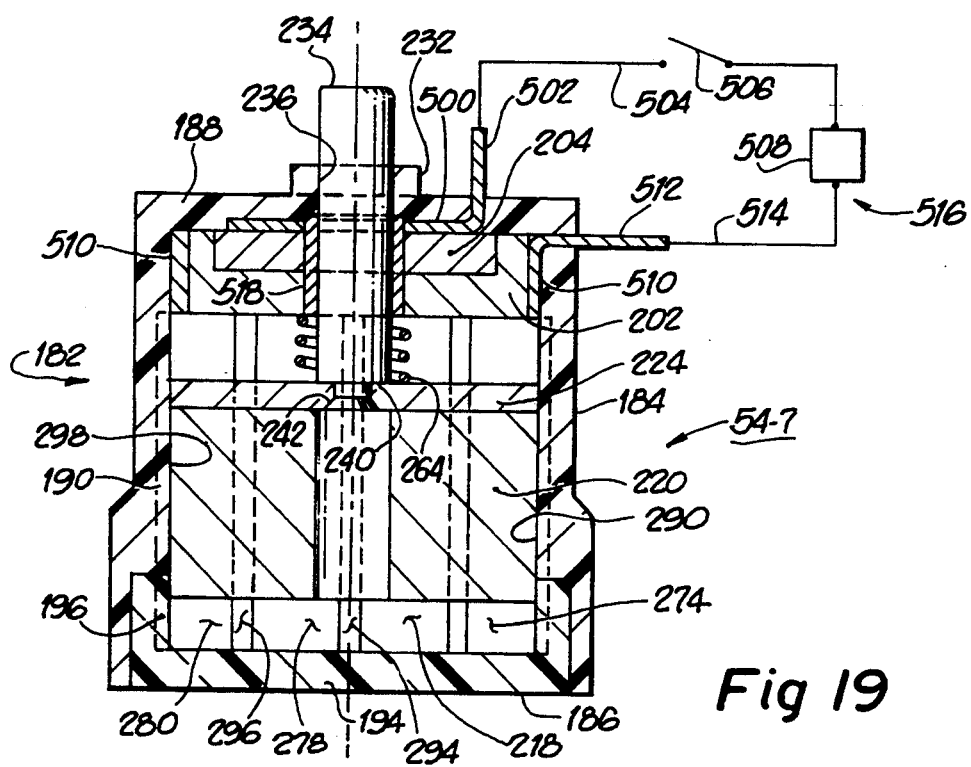
FIG. 19 is an axial cross-sectional view of still another assembly employing teachings of the invention.

The magnetic motors 54-6 and 54-7, respectively of FIGS. 18 and 19, are provided with self-heating as by means of an electrical current.

Referring first to FIG. 18, the magnetic motor 54-6 is illustrated as comprising a ferrite 202 and a PTC heater 204 much in the fashion of the embodiment of FIG. 11. An electrically conductive member 500, shown in operative contact with the conductive PTC heater 204, has an electrical terminal 502 suitably connected as to a conductor means 504, comprising associated switch means 506, leading to a suitable source 508 of electrical potential. An annular or ring-like electrically conductive member 510 is shown situated against and peripherally about the ferrite 202. The conductive member 510 is also provided with a terminal 512 suitably connected as to conductor means 514 leading to the suitable source 508 of electrical potential.

The embodiment of FIG. 18 enables the rapid release between the permanent magnet 220 and ferrite 202 by, instead of waiting for ambient heating of ferrite 202 to its curie temperature, $T_c$, electrically heating the ferrite 202 to its curie temperature as through circuit means 516 and PTC heater or current limiter 204. In the preferred embodiment of magnetic motor 54-6 the ferrite 202 is itself electrically conductive so that a current path is established from contact 500 through the heater means such as, for example, PTC resistor/heater 204, ferrite 202, ring-like contact 510 and into the remaining portion of circuit means 516.

When a voltage is applied to terminals 502, 512, a current passes through the PTC 204 and ferrite 202. In those situations wherein the ferrite 202 is electrically non-conductive, the ring-like conductor 510 may be removed from operative engagement with ferrite 202 and a smaller but similar ring-like conductor may be placed as peripherally about and against the PTC member 204 thereby having the current pass only through PTC member 204.

In the embodiment of FIG. 18, the previously described current flow results in ohmic heating of the PTC 204 and of the ferrite 202. Heat generated in the PTC 204 is also absorbed by the ferrite 202 through heat conduction. Heat is absorbed and/or generated in the ferrite 202 until the temperature of the ferrite 202 becomes of a value which is either equal to or greater than the curie temperature, $T_c$, of the ferrite 202. When this happens, ferrite 202 loses its magnetic properties and preloaded spring 264 repels the permanent magnet 220 from the ferrite 202. Such motion of permanent magnet 220 results in pin, output or actuator member 234 being moved through passage 236, generally outwardly of housing 182, as to assume what may be its maximum extended position. The heating current flow is maintained until the previously applied voltage is removed or the PTC 204 reaches a temperature, $T_p$ (where $T_p$ is greater than $T_c$) at which the PTC 204 limits current flow therethrough by rising to a high impedance. When, in PTC 204 the temperature falls below $T_p$, current is again permitted to increase until the PTC 204 temperature again rises to $T_p$.

In this manner, the ferrite 202 is kept at or above its curie temperature,$T_c$, as long as sufficient voltage is applied to the terminals 502 and 512 and/or the ambient temperature is kept at or above $T_c$.

When the voltage is removed from terminals 502 and 512 and the ambient temperature decreases to a value less than $T_c$, the ferrite 202 will cool to a temperature the value of which is less than the curie temperature, $T_c$, of ferrite 202. When this happens, ferrite 202 regains its magnetic properties thereby drawing permanent magnet 220 to ferrite 202 which, in turn, results in output or pin member 234 being drawn generally inwardly of housing 182 (upwardly as viewed in FIG. 18) to its least extended position.

In FIG. 19, elements like or similar to those of FIG. 18 are identified by like reference numbers.

In FIG. 19, the embodiment of the magnetic motor 54-7 operates, generally, in the same manner as does magnetic motor 54-6 of FIG. 18 except that when ferrite 202 is at a temperature below its curie temperature, $T_c$, permanent magnet 220 is, by magnetic attraction, effectively operatively against the ferrite 202 thereby causing the pin or output member 234 to be extended beyond housing 182 as to its maximum extended position. When the temperature of the ferrite 202 is at or above its curie temperature, $T_c$, it loses its magnetic properties and spring 264 moves the permanent magnet 220 away from ferrite 202 (downwardly in FIG. 19) resulting in pin or output member 234 being drawn into the housing 182 to assume a position wherein it, for example, least extends from housing 182. Of course, when the temperature of ferrite 202 decreases to a value less than the curie temperature, $T_c$, of the ferrite 202, the permanent magnet 220 is again attracted toward as to be effectively against ferrite 202. This, of course, causes the output member 234 to be extended, as to its maximum position, from housing 182.

In the preferred embodiment of the magnetic motor 54-7 the output member 234 is comprised of electrically conductive material and since it passes through cooperating passages in the ferrite 202, PTC member 204 and electrically conductive contact 500, a suitable dielectric bushing or sleeve 518 is fitted within such passages as to preclude having the output member 234 in any way become an electrical branch circuit or the like.

Figure 20:
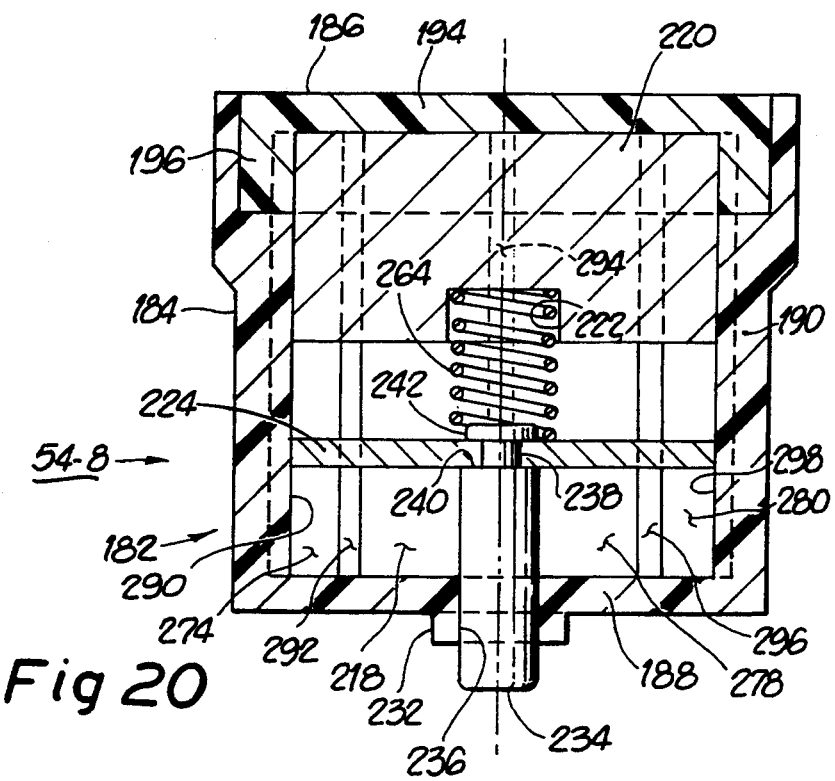
FIG. 20 is an axial cross-sectional view of yet another assembly employing teachings of the invention.
Figure 21:
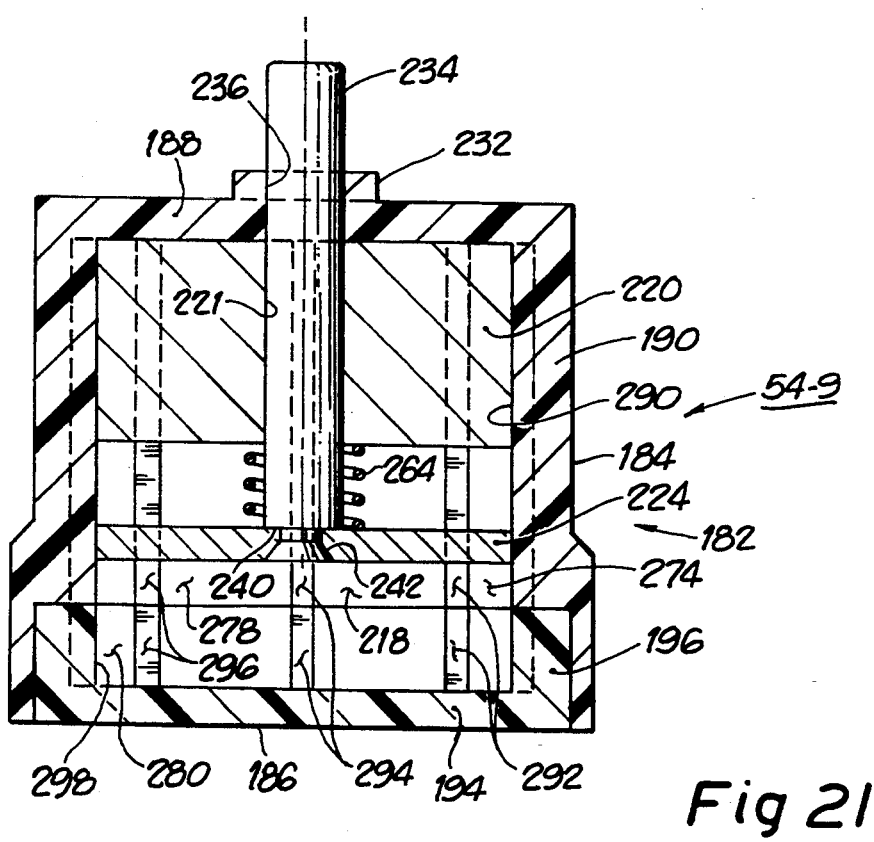
FIG. 21 is an axial cross-sectional view of another assembly employing teachings of the invention.

The magnetic motors 54-8 and 54-9 respectively of FIGS. 20 and 21 are embodiments which do not employ ferrites.

Referring first to FIG. 20, the permanent magnet 220 attracts a steel disk-like plate 224 at relatively lower temperatures of the permanent magnet 220. For a given magnetic material, there is a temperature range, $T_r$, through which the magnetization reversibly diminishes (in some cases by 30% or more). In the embodiment of FIG. 20, the permanent magnet 220 will partially demagnetize through temperature range, $T_r$, thereof enabling preloaded spring 264 to push steel plate 224 and pin or output member away from the permanent magnet 220. As a consequence of such movement, output or pin member 234 is moved, through passage 236 to an extended position outwardly of housing 182. If the temperature range, $T_r$, is not exceeded and when the temperature of the permanent magnet falls sufficiently below $T_r$, the permanent magnet 220 regains its magnetization and with such full return of the magnetization, the steel plate 224 is drawn back, against the resistance of spring 264, to the permanent magnet 220. This movement, of course, draws the output pin 234 inwardly of housing 182 (upwardly as viewed in FIG. 20).

In comparison, in the magnetic motor 54-9 of FIG. 21, when the permanent magnet 220 is heated through temperature, $T_r$, preloaded spring or resilient means 264 pushes steel plate 224 away from the permanent magnet and thereby causes the output member or pin 234 to be drawn, through passages 236 and 221, inwardly of housing 182 (downwardly as viewed in FIG. 21). When the magnet 220 regains its full magnetization, as described with regard to FIG. 20, the steel plate 224 is drawn back, against the resilient resistance of spring 264, to the permanent magnet 220. This movement, of course, pushes the output or pin member 234 in a direction generally outwardly of housing 182 (upwardly as viewed in FIG. 21) to its extended position.

In the various embodiments disclosed herein, magnetic forces provide a tractive force between a permanent and another element or member comprised of magnetic material. A spring placed between the magnetic components provides a repulsive force that tends to separate the magnetic components. Alternately, or in addition to the spring, gravity can provide a separating force by acting on one component while the other component is fixed against movement. It should also be made clear that at least in certain applications of the disclosed invention, the repulsive force may be provided, in part or in whole, by elastomeric means instead of or in addition to the various springs 264—264.

In all of the embodiments of the invention, a magnetic member will move to one position when above a given temperature, and move to another position when below a given temperature without the use of additional discrete actuators with temperature control electronics.

When a pin or other output member is secured to the moving member, the overall assembly can be installed in an associated operating structure such that the pin or output member is in shear relative to handles, knobs, levers, slides and the like to thereby either prevent or permit movement of such handles, knobs, levers, slides and the like. This may be done for purposes of safety, establishing security, determining sequence of related operations or movements, and actuation or de-actuation of an associated device, apparatus or system. By the appropriate configuring of the end of the output member or pin, such may be employed as a valving member operating in conjunction with an associated valve seat to control the flow of fluid through the passage circumscribed by the valve seat. Further, such could be employed as a principle valving member or function as a pilot valve.

By employing electrical contacts as generally depicted in FIG. 11, with or without the presence of the output pin, the invention may be employed to provide "on" and "off" electrical signals and may also be employed for the control of a related electrical power circuit.

One specific use of the invention, as disclosed in FIGS. 1-13, is the employment thereof as a stove oven door lock by actuating the output pin to a condition of shear thereby preventing the opening of the stove oven door while a set of electrical contacts such as 246, 248 and 228 of FIG. 11 enable the completion of the associated electrical circuit to the stove oven. Further, such an embodiment may be employed in cooperation with any type of sliding, swinging or roll-up door that might require opening or closing in an emergency such as fire or a high temperature. Such doors can be found on elevators, entrances and passages to and from buildings and rooms, environmental chambers, furnaces and around hot or extremely cold surfaces.

Additional applications or uses of the invention as herein disclosed could include the controlling of conduit flappers, butterfly valves, ball valves, gate valves and the like as, for example, would be found in heating ventilating and air conditioning systems and in plumbing systems.

If the embodiment of the invention comprises electrical contacts as, for example, 246,248 and 228 of FIG. 11 wherein such cooperatively provide an electrical switching function, such could also trigger alarms, indicate a monitored condition, and power or shutdown a device, apparatus or system in conjunction with the invention'other functions.

Still other uses of the invention as herein disclosed are contemplated. For example, the inventive magnetic motor may be employed: (a) in combination with vehicular or other radiator caps to prevent the opening of such caps when the radiator coolant is excessively hot; (b) as scald guards in bathing shower heads to thereby prevent the otherwise unexpected flow of scalding water out of such shower heads; (c) as locking means for preventing the opening of associated environmental chambers until a sensed or monitored temperature indicates such opening to be acceptable; and (d)to prevent the stopping of elevators as at each floor in the event of a fire in the building housing the elevators.

In all of the embodiments of the invention disclosed herein, the housing 182 was provided with relatively narrow longitudinally extending guide means or guide surfaces: 302, 286; 304, 288; 306, 290; 308, 292; 310, 294; 312, 296; 314, 298 and 316, 300. As should now be apparent, the practice of the invention does not require an all encompassing housing 182. That is, the invention is capable of being practiced with the use of guide means as hereinbefore disclosed which could be operatively connected to each other as by a wall functionally equivalent to, for example, wall 188 or, in fact, a wall functionally equivalent to wall 194. Substantial portions of the walls comprising the housings 182 could be eliminated retaining, in the main the previously identified longitudinally extending guide means.

In this context, the invention is capable of being practiced without what would be considered a housing such as 182. For example, referring to FIG. 14, a plurality of suitable longitudinally extending rods, serving as guide means, could be fixedly inserted into the permanent magnet 220 in a manner as to depend therefrom in a parallel relationship. The guide rods would then extend through respective relatively closely accommodating passages formed in the ferrite 202 and plate 224. Such guide rods could then be fixedly secured as to a transverse wall such as 188 or actually fixedly connected to a suitable spider which would carry the guide passage 236 for output member 234.

FIGS. 22-31 illustrate by fragmentary schematic electrical diagrams various manners and means by which ferrites, as used in most of the embodiments of the invention, can be heated.

Generally, FIGS. 22, 23, 24 and 25 depict various ways that either low or high resistance ferrites may be included in or with an electrical circuit.

Further, generally, FIGS. 26, 27, 28, 29, 30 and 31 relate more to high resistance ferrites where self-heating of the ferrite is desired in a control situation or application.

Figure 22:
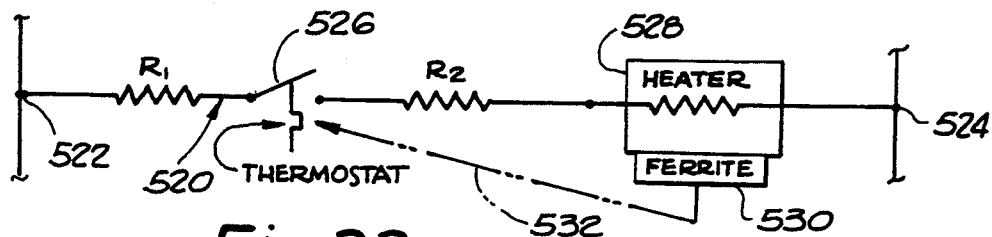
FIGS. 22, 23, 24 and 25 are somewhat fragmentary schematic wiring diagrams depicting a number of ways that either low or high resistance ferrites may be included in an electrical circuit.

The circuitry of FIG. 22 comprises conductor means 520, extending generally between terminals or points 522 and 524, in turn comprising series arranged resistor $R_1$, thermostatically actuated electrical switch means 526, resistor $R_2$ and resistive heater means 528 in intimate heat conductive contact with a ferrite 530. When a voltage is applied across points 522 and 524 with thermostatic switch 526 closed, current flows through resistors $R_1$ and $R_2$ and through resistive heater means 528 thereby heating such heater means which is in thermally conductive relationship with ferrite 530. Because of this conductive relationship ferrite 530 is heated by the heater means 528. Suitable temperature transducer or feed-back means 532 serves to sense the temperature of the ferrite 530 and convey a signal in response thereto to thermostatically controlled switch 526. When the signal via transducer means 532 indicates that the ferrite 530 has attained a preselected temperature, the thermostatic switch 526 is thermostatically opened to at least temporarily stop the generation of more heat by heater means 528. If the temperature of the ferrite 530 should, within limits, decrease to a lower temperature, the transducer signals such occurrence and the thermostatic switch 526 is again closed as to provide the needed heating of ferrite 530 via thermally conductive heating means 528. Resistors $R_1$ and $R_2$ are optional, depending upon a desire to limit current through the switch 526 in the event another electrical load is added after the switch 526 or to limit current flow into the heater means 528 for slower thermal response thereof.

Figure 23:
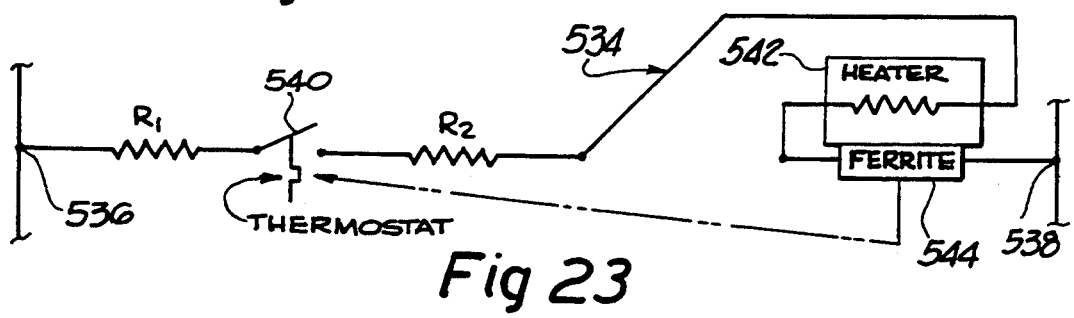

The circuitry of FIG. 23 comprises conductor means 534, extending generally between terminals or points 536 and 538, in turn comprising series arranged resistor $R_1$, thermostatically actuated electrical switch means 540, resistor $R_2$, resistive heater means 542 and ferrite 544. The resistive heater means 542 is in intimate heat conductive contact with ferrite 544. When a voltage is applied across points 536 and 538 with thermostatic switch 540 closed, current flows through resistors $R_1$ and $R_2$, through resistive heater means 542 and through ferrite 544. With ferrites having a relatively high electrical resistance, the arrangement of FIG. 23 provides ohmic heating in the ferrite in addition to the ferrite being heated by the heater means 542. With ferrites having a relatively low electrical resistance, ohmic heating may be minimal but the physical packaging of the heater means 542 and ferrite 544 may be simplified. Resistors $R_1$ and $R_2$ are optional and are provided for the reasons and purposes described with regard to FIG.

22. As indicated at 546 feed-back means serves to supply a signal, indicative of the temperature of ferrite 544, to the thermostatic switch 540.

Figure 24:
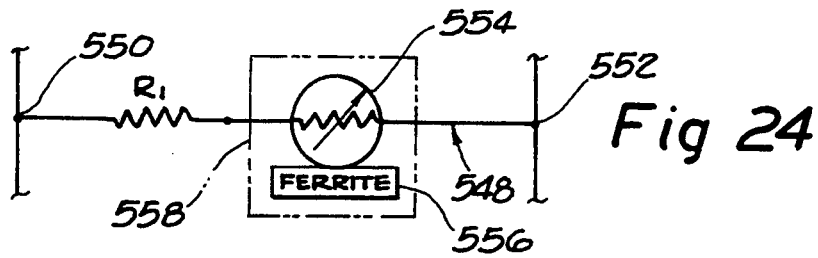

The circuitry of FIG. 24 comprises conductor means 548, extending generally between terminals or points 550 and 552, in turn comprising series arranged resistor $R_1$ and a PTC heater means 554. In this arrangement when a voltage is applied across points 550 and 552 the PTC 554 is heated and the heated PTC 554 conductively supplies heat to the ferrite 556. The PTC 554 and ferrite 556 may be packaged together as generally depicted in phantom line at 558. Resistor $R_1$ is provided to limit the in-rush of current to the PTC 554, if such be desired.

Figure 25:
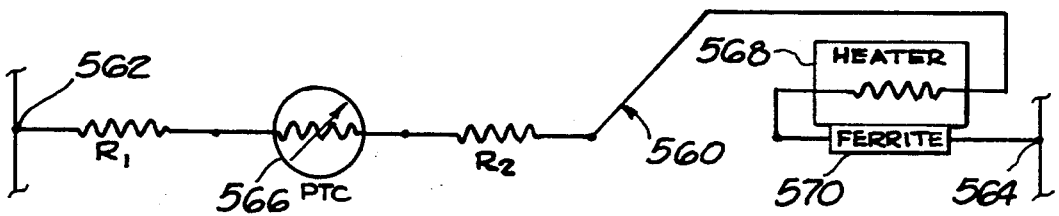

The circuitry of FIG. 25 comprises conductor means 560, extending generally between terminals or points 562 and 564, in turn comprising series arranged resistor $R_1$, PTC member 566, resistor $R_2$, resistive heater means 568 and ferrite 570. In comparing the arrangements of FIGS. 23 and 25 it can be seen that the difference therebetween resides in having the thermostatic switch 540 of FIG. 23 replaced by the PTC member 566 of FIG. 25. The PTC member 566 may be employed to control the temperature of the ferrite 570 or even add heat to ferrite 570 as, for example, in the manner depicted in FIG. 24. Resistors $R_1$ and $R_2$ are optional and are provided for the reasons and purposes described with regard to FIG. 22.

Figure 26:
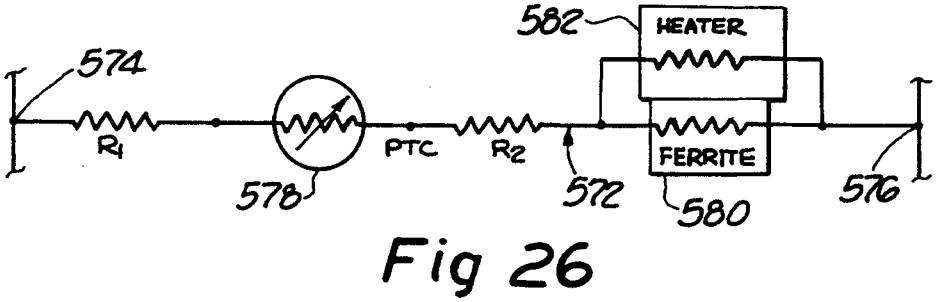
FIGS. 26, 27, 28, 29, 30 and 31 are somewhat fragmentary schematic wiring diagrams which depict or relate more directly to high resistance ferrites where self-heating of the ferrite is desirable.

The circuitry of FIG. 26 comprises conductor means 572, extending generally between terminals or points 574 and 576, in turn comprising series arranged resistor $R_1$, PTC member 578, resistor $R_2$, a resistive ferrite 580 and heater means 582 in parallel with ferrite 580. As depicted, the heater means 582 is preferably situated in a thermally conductive relationship with ferrite 580. The parallel arrangement of the heater means and ferrite 580 brings the ferrite 580 to its curie temperature more quickly. Again resistors $R_1$ and $R_2$ are optional and are provided for reasons described with regard to FIG. 22.

Figure 27:
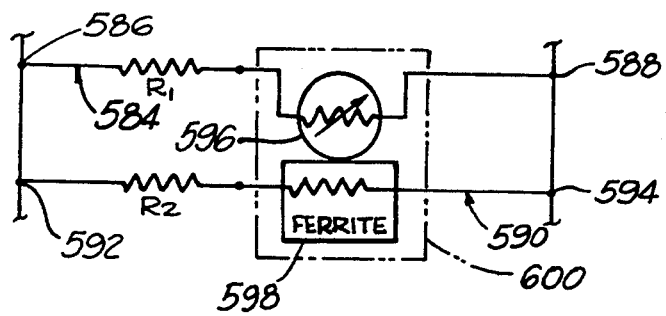

The circuitry of FIG. 27 comprises conductor means 584, extending generally between terminals or points 586 and 588, and conductor means 590 extending generally between terminals or points 592 and 594. Conductor means 584 comprises a series arranged resistor $R_1$ and a PTC apparatus 596. Conductor means 590 comprises a series arrangement of a resistor $R_2$ and a resistive ferrite 598. Preferably, the heat producing PTC 596 is in a thermally conductive relationship with ferrite 598. The PTC member 596 and ferrite 598 may be packaged together as generally depicted in phantom line at 600. As should be evident, the PTC 596 and ferrite 598 are in electrically parallel relationship. In some instances it may be desirable to maintain the ferrite 598 at some elevated temperature by controlling current flow into the ferrite 598 with resistor $R_2$. It may be further desirable to attain the curie temperature of the ferrite 598 as with a self-heating PTC 596. If input current to the PTC 596 is critical, $R_1$ may be provided.

Figure 28:
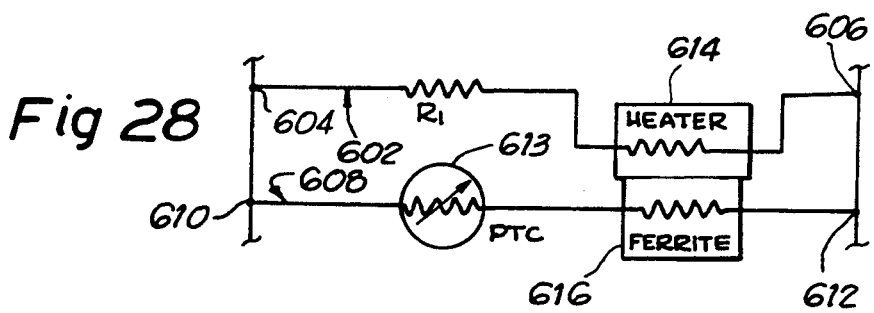

The circuitry of FIG. 28 comprises conductor means 602 extending generally between terminals or points 604 and 606 and a conductor means 608 extends generally between terminals or points 610 and 612. Conductor means 602 comprises series arranged resistor $R_1$ and resistive heater means 614 while conductor means 608 comprises series arranged PTC member 613 and a resistive ferrite 616. As depicted, the resistive heater 614 is in a thermally conductive relationship with ferrite 616. In the arrangement of FIG. 28 the heater means 614 is allowed to be used as a bias with resistor $R_1$, if necessary, for controlling the current. The PTC 613 is employed to control the temperature of the ferrite 616 and allow it to exceed its curie temperature. The PTC 613 may also be employed as a source of heat for ferrite 616 especially if placed in intimate heat conducting contact with ferrite 616 as, for example, depicted in FIG. 27.

Figure 29:
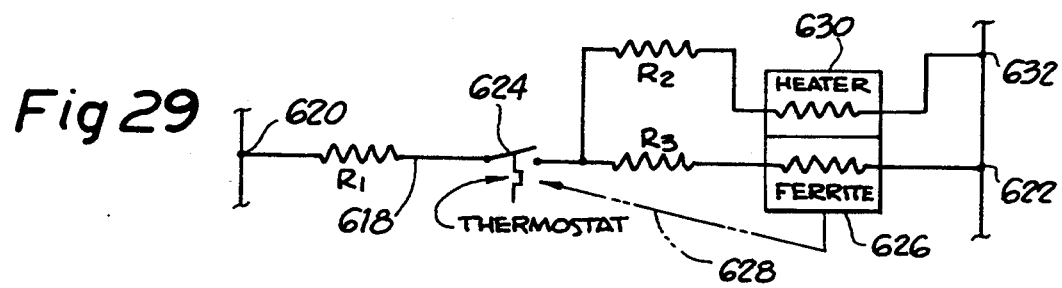

The circuitry of FIG. 29 comprises conductor means 618, extending generally between terminals or points 620 and 622, further comprises series arranged resistor $R_1$, thermostatically actuated electrically switch means 624, resistor $R_3$ and resistive ferrite 626. Suitable temperature transducer or feed-back means 628 serves to sense the temperature of ferrite 626 and convey a signal, in response thereto, to the thermostatically controlled switch 624. Further a branch circuit comprising series arranged resistor $R_2$ and resistive heater means 630 is in parallel relationship to resistor $R_3$ and ferrite 626. Heater 630 is shown connected to terminal or point 632; however, points 622 and 632 may be one and the same. Again, preferably, the heater means 630 is placed in thermally conductive relationship with ferrite 626. Generally the embodiment of FIG. 29 has significant similarity to that of the embodiment of FIG. 26. In FIG. 29, resistors $R_1$, $R_2$ and $R_3$ are optional current controls.

Figure 30:
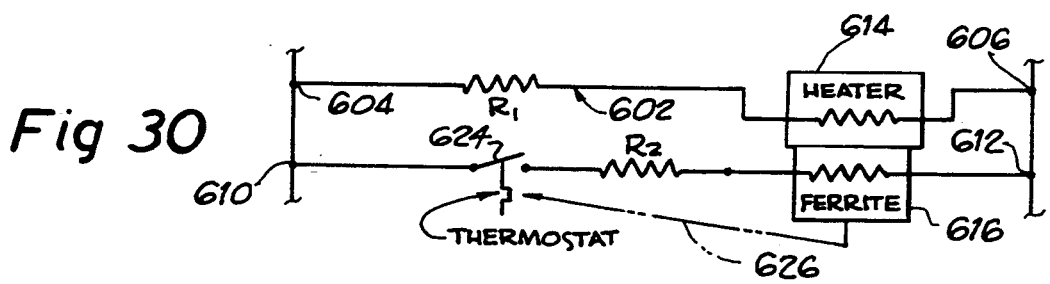

The circuitry of FIGS. 28 and 30, generally, correspond to each other and to the extent that they are the same, the same or corresponding reference numbers of FIG. 28 are applied to the circuitry of FIG. 30. The main difference between FIGS. 28 and 30 is that the PTC 614 is employed in FIG. 28 while in FIG. 29 the thermostatic switch 624 and a transducer or feed-back means 626 is employed. Resistors $R_1$ and $R_2$ are optional current controllers.

Figure 31:
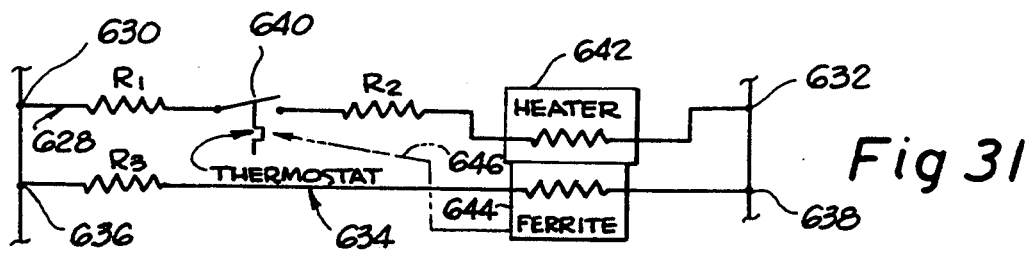

The circuitry of FIG. 31 comprises conductor means 628, extending generally between terminals or points 630 and 632, and a second conductor means 634 extending generally between terminals or points 636 and 638. Conductor means 628 comprises series arranged resistor $R_1$, thermostatic electrical switch 640, resistor $R_2$ and a resistive heater means 642. Conductor means 634 comprises series arranged resistor $R_3$ and resistive ferrite 644 which is provided with temperature transducer or feedback means 646 serving to sense the temperature of ferrite 644 and convey a signal in response thereto to thermostatically controlled switch 640. As depicted, the heater means 642 is in thermally conductive relationship with ferrite 644. The arrangement of FIG. 31 allows the ferrite 644 to maintain a bias temperature through resistor $R_3$. The heater 642 is, of course, controlled by the thermostatic switch 640. Resistors $R_1$ and $R_2$ are optional current controllers at switch 640 or at the heater 642 as may be required.

As should be apparent, the invention and embodiments disclosed herein have an array of uses and, even though shown in combination with an electric stove and oven, the use of the magnetic motor 54 is not so limited and, among other uses, may be employed in combination with gas stoves and the like.

It is believed that, as now known, the best embodiments for practicing the invention have been disclosed and described along with certain selected modifications and it is apparent that other embodiments and modifications are possible within the scope of the appended claims.

What is claimed is:

1. A magnetic motor, comprising a ferrite, a permanent magnet situated as to be at least relatively close to said ferrite, wherein said permanent magnet is held relatively stationary while said ferrite is permitted to move, wherein said ferrite and said permanent magnet are magnetically attracted toward each other, wherein said ferrite has a curie temperature of preselected magnitude, wherein when said ferrite is at a temperature equal to or greater than said curie temperture said ferrite loses its magnetic properties, wherein upon said ferrite losing its magnetic properties said ferrite is enabled to move away from said permanent magnet, and wherein when the temperature of said ferrite becomes less than said curie temperature said ferrite regains its magnetic properties and said ferrite is urged to move toward said permanent magnet.

2. A magnetic motor according to claim 1 and further comprising output means operatively positioned in accordance with the position of said ferrite to thereby produce an output reflective of the position of said ferrite.

3. A magnetic motor according to claim 2 wherein said output means has a first output position when said ferrite is situated at least relatively close to said permanent magnet, and wherein said output means has a second output position when said ferrite has moved to a maximum position away from said permanent magnet.

4. A magnetic motor according to claim 1 and further comprising motion guide means effective to guide the movement of said ferrite during such times as when said ferrite is moving either away from or toward said permanent magnet.

5. A magnetic motor according to claim 4 and further comprising a plurality of said motion guide means, wherein said plurality of motion guide means longitudinally extend generally in the direction in which said ferrite undergoes movement, wherein said ferrite comprises an outer generally circumscribing periphery, and wherein said plurality of motion guide means are situated in juxtaposition to said periphery and spaced from each other.

6. A magnetic motor according to claim 5 and further comprising a housing, said housing comprising first and second end walls and a side wall generally circumscribing said ferrite and said permanent magnet, wherein said side wall is joined to said first and second end walls, wherein said side wall comprises an inner disposed wall surface generally facing said ferrite and an outer disposed wall surface carried by said side wall as to be oppositely disposed with respect to said inner disposed wall surface, and wherein said plurality of motion guide means are carried by said inner disposed wall surface.

7. A magnetic motor according to claim 1 and further comprising output means operatively positioned in accordance with the position of said ferrite to thereby produce an output reflective of the position of said ferrite, wherein said output means comprises a shaft-like member having at least two operating positions, wherein when said ferrite is situated as to be relatively close to said permanent magnet said shaft-like member assumes a first of said at least two operating positions, and wherein when said ferrite has moved a maximum distance from said permanent magnet said shaft-like member assumes a second of said at least two operating positions.

8. A magnetic motor according to claim 7 wherein when said shaft-like member assumes said first of said at least two operating positions said shaft-like member is in a comparatively withdrawn condition, and wherein when said shaft-like member assumes said second of said at least two operating positions said shaft-like member is in a comparatively extended condition.

9. A magnetic motor according to claim 7 wherein when said shaft-like member assumes said first of said at least two operating positions said shaft-like member is in a comparatively extended condition, and wherein when said shaft-like member assumes said second of said at least two operating positions said shaft-like member is in a comparatively withdrawn condition.

10. A magnetic motor according to claim 1 and further comprising resilient resistance means normally urging said ferrite in a direction away from said permanent magnet.

11. A magnetic motor, comprising a first member having magnetic properties, a second member having magnetic properties in at least relatively close proximity to said first member and magnetically attracted to said first member, an output member wherein said first member is fixed against movement, wherein at a preselected elevated temperature the strength of said magnetic attraction is at least substantially diminished and said second member is enabled to move away from said first member and causes said output member to be moved by said second member, and further comprising first electrical contact means and second electrical contact means, wherein said first electrical contact means is operatively connected to said second member for movement therewith, wherein at a temperature less than said preselected elevated temperature said first electrical contact means are spaced from said second electrical contact means, and wherein when at a temperature equal to or greater than said preselected elevated temperature said second member is moved away from said first member and moves to where said first electrical contact means is closed against said second electrical contact means to thereby close an electrical circuit therethrough.

12. A magnetic motor according to claim 11 wherein one of said first and second electrical contact means comprises a plurality of electrical contacts, and wherein the other of said first and second electrical contact means comprises a single electrical contact spanning said plurality of electrical contacts.

13. A magnetic motor according to claim 12 wherein said single electrical contact is comprised of a ring-like configuration.

14. A magnetic motor, comprising a first member having magnetic properties, a second member having magnetic properties in at least relatively close proximity to said first member and magnetically attracted to said first member, an output member wherein said first member is fixed against movement, wherein at a preselected elevated temperature the strength of said magnetic attraction is at least substantially diminished and said second member is enabled to move away from said first member and causes said output member to be moved by said second member, wherein said first member comprises a ferrite, and wherein said second member comprises a permanent magnet.

15. A magnetic motor according to claim 14 wherein said permanent magnet moves away from said ferrite by the force of gravity acting upon said permanent magnet.

16. A magnetic motor according to claim 14, wherein said output member is operatively connected to said permanent magnet for movement in unison therewith, and wherein when said permanent magnet moves away from said ferrite said output member is moved toward a maximum extended position of said output member.

17. A magnetic motor according to claim 14 wherein when said ferrite is at a temperature less than its curie temperture said magnetic properties are restored to said ferrite and said magnetic attraction is restored to its full strength, and wherein when said magnetic attraction is restored to its full strength said permanent magnet is attracted by said magnetic attraction of full strength and returns to a position in at least relatively close proximity to said ferrite and moves with it said output member away from its maximum extended position.

18. A magnetic motor according to claim 14, wherein said output member is operatively connected to said permanent magnet for movement in unison therewith, and wherein when said permanent magnet moves away from said ferrite said output member is moved toward a least extended position.

19. A magnetic motor according to claim 18 wherein when said ferrite is at a temperature less than its curie temperature said magnetic properties are restored to said ferrite and said magnetic attraction is restored to its full strength, and wherein when said magnetic attraction is restored to its full strength said permanent magnet is attracted by said magnetic attraction a full strength and returns to a position in at least relatively close proximity to said ferrite and moves with it said output member away from its said least extended position and toward a maximum extended position of said output member.

20. A magnetic motor according to claim 14 and further comprising spring means, wherein said spring means continually urges said permanent magnet away from said ferrite, and wherein said spring means is effective to move said permanent magnet away from said ferrite when said ferrite is at a temperature equal to or greater than said preselected elevated temperature.

21. A magnetic motor according to claim 20 wherein said spring means is situated effectively between said ferrite and said permanent magnet.

22. A magnetic motor according to claim 14 wherein said first member comprises a ferrite, and further comprising spring means, wherein said spring means continually urges said permanent magnet away from said ferrite, and wherein said permanent magnet is moved away from said ferrite by said spring means and the force of gravity when said ferrite is at a temperature equal to or greater than its curie temperature.

23. A magnetic motor according to claim 22 wherein when said ferrite is at a temperature less than its curie temperature said magnetic properties are restored to said ferrite and said magnetic attraction is restored to its full strength, and wherein when said magnetic attraction is restored to its full strength said permanent magnet is attracted by said magnetic attraction of full strength and returns against said force of gravity and against the resilient resistance of said spring means to a position in at least relatively close proximity to said ferrite.

24. A magnetic motor according to claim 14 and further comprising first electrical contact means and second electrical contact means, wherein said first electrical contact means is operatively connected to said permanent magnet for movement therewith, wherein when said ferrite is at a temperature less than its curie temperature said first electrical contact means are spaced from said second electrical contact means, and wherein when said ferrite is at a temperature equal to or greater than said curie temperature said permanent magnet is moved away from said ferrite and moves to where said first electrical contact means close against said second electrical contact means to thereby close an electrical circuit therethrough.

25. A magnetic motor according to claim 24 wherein one of said first and second electrical contact means comprises a plurality of electrical contacts, and wherein the other of said first and second electrical contact means comprises a single electrical contact spanning said plurality of electrical contacts.

26. A magnetic motor according to claim 25 wherein said single electrical contact is comprised of a ring-like configuration.

27. A magnetic motor according to claim 14 wherein said ferrite is electrically heated to a temperature equal to or above its curie temperature.

28. A magnetic motor according to claim 14 and further comprising means for heating said ferrite to a temperture equal to or above its curie temperature.

29. A magnetic motor according to claim 28 wherein said means for heating said ferrite comprises electrical resistance placed in heat conducting relationship with said ferrite.

30. A magnetic motor according to claim 29 and further comprising means for controlling current flow through said electrical resistance, and wherein said means for controlling current flow comprises a resistor of a positive temperature coefficient.

31. A magnetic motor according to claim 29 and further comprising means for controlling current flow through said electrical resistance, and wherein said means for controlling current flow comprises thermostatically controlled switch means.

32. A magnetic motor according to claim 28 wherein said means for heating said ferrite comprises an electrically resistive heater, and wherein electrical current is flowed in series circuit through said electrically resistive heater and said ferrite.

33. A magnetic motor according to claim 28 wherein said means for heating said ferrite comprises an electrical resistance of a positive temperature coefficient.

34. A magnetic motor, comprising a permanent magnet creating a magnetic field, a first ferrite situated in at least relatively close proximity to said permanent magnet and attracted by said magnetic field, a second ferrite situated in at least relatively close proximity to said first ferrite as to place said first ferrite generally between said permanent magnet and said second ferrite, wherein said second ferrite is attracted by said magnetic field, wherein said first ferrite has a curie temperature of a first magnitude, wherein said second ferrite has a curie temperature of a second magnitude, wherein said curie temperature of said first magnitude is less in magnitude than said curie temperature of said second magnitude, wherein when said first ferrite is at said curie temperature of a first magnitude said first ferrite ceases to be attracted by said magnetic field, wherein when said first ferrite is at said curie temperature of a first magnitude and said second ferrite is at a temperature less than said curie temperature of a second magnitude said second ferrite prevents said first ferrite from moving away from said permanent magnet, and wherein when said first ferrite is at a temperature equal to or greater than said curie temperature of a first magnitude and said second ferrite is at a temperature at least equal to said curie temperature of a second magnitude both said first and second ferrites are enabled to move away from said permanent magnet.

35. A safety lock for a stove having a main structure and comprising an oven and an oven door openable for access to said oven, and further comprising a latch portion carried by said door, a latching apparatus carried by said main structure, wherein said latching apparatus comprises a plurality of latching members at least one of which is relatively movable, a passage segment formed in each of said latching members, wherein said latching members are effective to cooperatively hold said latch portion when said oven door is closed, wherein when said latch portion is held by said latching members said passage segments become operatively aligned with each other as to thereby create a continuous passage, and a locking member adapted to be received in said continuous passage to preclude said latching members releasing said latch portion when the temperature of said oven is at a magnitude considered unsafe to have said oven door become opened, and further comprising a ferrite, a permanent magnet situated as to be at least relatively close to said ferrite, wherein said ferrite is held relatively stationary while said permanent magnet is permitted to move, wherein said ferrite and said permanent magnet are magnetically attracted to each other, said locking member being positioned in accordance with the position of said permanent magnet, wherein said ferrite has a curie temperature, wherein when said ferrite is at a temperature equal to or greater than said curie temperature said ferrite loses its magnetic properties, wherein upon said ferrite losing its magnetic properties said permanent magnet moves away from said ferrite and in so doing causes said locking member to be placed into said continuous passage, and wherein the temperature of said ferrite is equal to or greater than said curie temperature during periods when the temperature of said oven is at said unsafe magnitude.

36. A magnetic motor according to claim 32 and further comprising means for controlling current flow through said electrically resistive heater, and wherein said means for controlling current flow comprises a resistor of a positive temperature coefficient.

37. A magnetic motor according to claim 32 and further comprising means for controlling current flow through said electrically resistive heater, and wherein said means for controlling current flow comprises a thermostatically controlled switch.

38. A magnetic motor according to claim 28 wherein said means for heating said ferrite comprises an electrically resistive heater in heat conducting relationship with said ferrite, and wherein electrical current is flowed in parallel circuit through said electrically resistive heater and said ferrite.

39. A magnetic motor according to claim 38 and further comprising means for controlling current flow through both said electrically resistive heater and said ferrite, and wherein said means for controlling current flow comprises a resistor of a positive temperature coefficient.

40. A magnetic motor according to claim 38 and further comprising means for controlling current flow through both said electrically resistive heater and said ferrite, and wherein said means for controlling current flow comprises a thermostatically controlled switch.

41. A magnetic motor according to claim 38 and further comprising means for controlling current flow through only said ferrite.

42. A magnetic motor according to claim 41 wherein said means for controlling current flow comprises an electrical resistance of a positive temperature coefficient.

43. A magnetic motor according to claim 41 wherein said means for controlling current flow comprises a thermostatically controlled switch.

44. A magnetic motor according to claim 38 and further comprising means for controlling current flow through only said electrically resistive heater.

45. A magnetic motor according to claim 44 wherein said means for controlling current flow through only said electrically resistive heater comprises a thermostatically controlled switch.

46. A magnetic motor, comprising a ferrite, a permanent magnet situated as to be at least relatively close to said ferrite, wherein said ferrite is held relatively stationary while said permanent magnet is permitted to move, wherein said ferrite and said permanent magnet are magnetically attracted toward each other, wherein said ferrite has a curie temperature, wherein when said ferrite is at a temperature equal to or greater than said curie temperature said ferrite loses its magnetic properties, wherein upon said ferrite losing its magnetic properties said permanent magnet is enabled to move away from said ferrite, and wherein when the temperature of said ferrite becomes less than said curie temperature said ferrite again becomes vested with its magnetic properties and said permanent magnet is urged to move toward said ferrite.

47. A magnetic motor according to claim 46 and further comprising output means operatively positioned in accordance with the position of said permanent magnet to thereby produce an output reflective of the position of said permanent magnet.

48. A magnetic motor according to claim 47 wherein said output means has a first output position when said permanent magnet is situated at least relatively close to said ferrite, and wherein said output means has a second output position when said permanent magnet has moved to a maximum position away from said ferrite.

49. A magnetic motor according to claim 46 and further comprising electrical switch means for opening and closing related circuitry, wherein said electrical switch means comprises at least first and second electrical contacts, wherein said first electrical contact is relatively stationary while said second electrical contact is relatively movable toward and away from said first electrical contact, wherein said second electrical contact is operatively positioned in response to the movement of said permanent magnet as to at times close against said first electrical contact and close an electrical circuit therethrough.

50. A magnetic motor according to claim 49 wherein said second electrical contact is made closed against said first electrical contact when said permanent magnet has moved a preselected distance away from said ferrite.

51. A magnetic motor according to claim 46 and further comprising first and second electrical contact means for at times opening and at other times closing a related electrical circuit, and wherein said first and second electrical contact means are made to open and close against each other in response to the position of said permanent magnet relative to said ferrite.

52. A magnetic motor according to claim 51 wherein one of said first and second electrical contact means comprises a plurality of electrical contacts, and wherein the other of said first and second electrical contact means comprises at least one spanning type electrical contact effective for spanning and closing as against at least two of said plurality of electrical contacts.

53. A magnetic motor according to claim 46 and further comprising motion guide means, said motion guide means being effective to guide the movement of said permanent magnet during such times as when said permanent magnet is moving either away from or toward said ferrite.

54. A magnetic motor according to claim 53 and further comprising a plurality of said motion guide means, and wherein said plurality of motion guide means longitudinally extend generally in the direction in which said permanent magnet undergoes movement.

55. A magnetic motor according to claim 54 wherein said permanent magnet comprises an outer generally circumscribing periphery, and wherein said plurality of motion guide means are situated in juxtaposition to said periphery and spaced from each other.

56. A magnetic motor according to claim 55 and further comprising a housing, said housing comprising first and second end walls and a side wall generally circumscribing said ferrite and said permanent magnet, wherein said side wall is joined to said first and second end walls, wherein said side wall comprises an inner disposed wall surface generally facing said permanent magnet and an outer disposed wall surface carried by said side wall as to be oppositely disposed with respect to said inner disposed wall surface, and wherein said plurality of motion guide means are carried by said inner disposed wall surface.

57. A magnetic motor according to claim 56 wherein said plurality of motion guide surfaces are integrally formed with said side wall as to extend therefrom a preselected distance.

58. A magnetic motor according to claim 46 and further comprising output means operatively positioned in accordance with the position of said permanent magnet to thereby produce an output reflective of the position of said permanent magnet, wherein said output means comprises a shaft-like member having at least two operating positions, wherein when said permanent magnet is situated as to be relatively close to said ferrite said shaft-like member assumes a first of said at least two operating positions, and wherein when said permanent magnet has moved a maximum distance from said ferrite said shaft-like member assumes a second of said at least two operating positions.

59. A magnetic motor according to claim 58 wherein when said shaft-like member assumes said first of said at least two operating positions said shaft-like member is in a comparatively withdrawn condition, and wherein when said shaft-like member assumes said second of said at least two operating positions said shaft-like member is in a comparatively extended condition.

60. A magnetic motor according to claim 46 and further comprising resilient resistance means normally urging said permanent magnet in a direction away from said ferrite.

61. A magnetic motor according to claim 60 and further comprising passage-like means formed in said permanent magnet for at least the partial reception therein of said resilient resistance means.

62. A magnetic motor according to claim 46 and further comprising an electrical resistor as a heater in heat conducting relationship with said ferrite.

63. A magnetic motor according to claim 46 and further comprising electrical circuit means operatively connected to said ferrite as to flow an electrical current through said ferrite.

64. A magnetic motor according to claim 46 and further comprising an electrically resistive heater in heat conducting relationship with said ferrite, and electrical circuit means operatively connected to both said resistive heater and said ferrite for providing a flow of current therethrough.

65. A magnetic motor according to claim 64 wherein said resistive heater and said ferrite are in electrically series relationship with each other whereby said flow of current passes serially through said resistive heater and said ferrite.

66. A magnetic motor according to claim 10 and further comprising passage-like means formed in said ferrite for at least the partial reception therein of said resilient resistance means.

67. A magnetic motor according to claim 34, wherein wherein when said first and second ferrites are remotely spaced from said permanent magnet said first ferrite is at a temperature equal to or greater than said curie temperature of a first magnitude and said second ferrite is at a temperature equal to or greater than said curie temperature of a second magnitude, wherein when thusly remotely spaced the temperature of said second ferrite becomes less than the curie temperature of said second magnitude said first and second ferrites because of being remotely spaced from said permanent magnet are not sufficiently attracted to move toward said permanent magnet, and wherein when said remotely spaced second ferrite is at a temperature less than the curie temperature of said second magnitude and at the same time said remotely spaced first ferrite is at a temperature less than the curie temperature of a first magnitude the magnitude of the combined magnetic attraction of the first and second ferrites is sufficient to cause both first and second ferrites to move from being remotely spaced and toward said permanent magnet.

68. A magnetic motor, comprising a permanent magnet creating a magnetic field, a ferrite situated in at least relatively close proximity to said permanent magnet and being magnetically attracted to said permanent magnet, said ferrite becoming able to move away from said permanent magnet and to a position remote to said permanent magnet when said ferrite is at a temperature that is equal to or greater than a curie temperature of a first magnitude of temperature, and said ferrite becoming able to move away from said remote position and toward said permanent magnet when said ferrite is at less than a curie temperature of a second magnitude of temperature, and wherein said second magnitude of temperature is less in magnitude than said first magnitude of temperature.

* * * * *

UNITED STATES PATENT AND TRADEMARK OFFICE
CERTIFICATE OF CORRECTION

PATENT NO. : 5,397,948
DATED : March 14, 1995
INVENTOR(S) : Marty M. Zoerner & Stephen R.W. Cooper It is certified that error appears in the above-identified patent and that said Letters Patent is hereby corrected as shown below:

Column 19, line 35 change "invention'other"
to ---- invention's other ----.

Column 30, line 26 (Claim 67, line 1 thereof) delete "wherein".

Signed and Sealed this

Second Day of May, 1995

Attest:

BRUCE LEHMAN

Attesting Officer

Commissioner of Patents and Trademarks